(12) United States Patent
Rong et al.

(10) Patent No.: US 7,172,737 B2
(45) Date of Patent: Feb. 6, 2007

(54) FUEL CONVERSION REACTOR

(75) Inventors: Xiaoyang Rong, Toronto (CA); Brian E. Cheadle, Brampton (CA)

(73) Assignee: Dana Canada Corporation (CA)

( * ) Notice: Subject to any disclaimer, the term of this patent is extended or adjusted under 35 U.S.C. 154(b) by 0 days.

(21) Appl. No.: 10/541,289

(22) PCT Filed: Dec. 31, 2003

(86) PCT No.: PCT/CA03/02029

§ 371 (c)(1),
(2), (4) Date: Jun. 30, 2005

(87) PCT Pub. No.: WO2004/059232

PCT Pub. Date: Jul. 15, 2004

(65) Prior Publication Data

US 2006/0051261 A1    Mar. 9, 2006

(30) Foreign Application Priority Data

Dec. 31, 2002 (CA) ................... 2415536

(51) Int. Cl.
| | |
|---|---|
| *B01J 8/04* | (2006.01) |
| *B01J 8/02* | (2006.01) |
| *B01J 10/00* | (2006.01) |
| *B01J 19/00* | (2006.01) |
| *F28D 7/00* | (2006.01) |

(52) U.S. Cl. .............. 422/198; 422/201; 422/202; 422/194; 422/129; 422/188; 422/190; 422/189; 422/192; 422/211

(58) Field of Classification Search ............ 422/201
See application file for complete search history.

(56) References Cited

U.S. PATENT DOCUMENTS 2,612,350 A    9/1952  Stadler ................... 165/82

(Continued)

FOREIGN PATENT DOCUMENTS

DE    23 41 808 A1    8/1973

(Continued)

OTHER PUBLICATIONS

International Search Report issued by European Patent Office in International Application No. PCT/CA03/02029 (May 6, 2004).
G.F. Hewitt, "Heat Exchanger Design Handbook 1998," Begell House, Inc., 1998, pp. 3.1.2-1 to 3.1.2-6, 3.3.1-1 to 3.3.1-2, 4.1.6-1, 4.2.3-1 to 4.2.3-7.

(Continued)

*Primary Examiner*—Alexa Neckel
*Assistant Examiner*—Kaity Handal
(74) *Attorney, Agent, or Firm*—Dykema Gossett PLLC

(57) ABSTRACT

A conversion reactor (10) including an outer shell (12) having first (14) and second (16) ends and an inner surface (16) a primary inner shell (30) extending into the outer shell (12), the primary inner shell (30) defining a heat exchanging chamber (100) and having primary and secondary (34) ends, and a secondary inner shell (40) having a first end (42) located adjacent the secondary end (34) of the primary inner shell (30). One or more oulet apertures (46) are formed between the two inner shells (30,40) for passage of the gaseous fluid out of the heat exchanging chamber (100). There are also a plurality of heat exchange tubes (50) extending through the heat exchanging chamber (100) between first (58) and second (64) tube sheets and connected to same. The first tube sheet (58) is mounted in the primary inner shell (30) while the second tube sheet (64) is connected to the secondary inner shell (40). The adjacent ends (42,34) of the inner shells (40,30) form a disconnected joint and the secondary inner shell is free to move relative to the primary inner shell upon thermal expansion of the tubes (50).

34 Claims, 13 Drawing Sheets

U.S. PATENT DOCUMENTS

| | | | |
|---|---|---|---|
| 2,672,849 A | 3/1954 | Fruit | 122/333 |
| 3,467,504 A | 9/1969 | Korwin | 280/31 |
| 3,909,299 A | 9/1975 | Corrigan | 33/639 |
| 4,049,048 A | 9/1977 | Leedham | 422/197 |
| 4,113,441 A | 9/1978 | Suzuki et al. | 422/197 |
| 4,249,596 A | 2/1981 | Tutak et al. | 165/161 |
| 4,434,846 A | 3/1984 | Lu | 422/201 |
| 4,904,455 A | 2/1990 | Karafian et al. | 422/201 |
| 4,942,022 A | 7/1990 | Kasai et al. | 422/201 |
| 5,048,596 A | 9/1991 | Lu | 165/41 |
| 5,248,566 A | 9/1993 | Kumar et al. | 429/19 |
| 5,382,271 A | 1/1995 | Ng et al. | 48/61 |
| 5,434,846 A | 7/1995 | Tremel et al. | 370/252 |
| 5,484,577 A | 1/1996 | Buswell et al. | 422/211 |
| 5,518,705 A | 5/1996 | Buswell et al. | 423/437.2 |
| 5,762,658 A | 6/1998 | Edwards et al. | 48/197 R |
| 5,772,707 A | 6/1998 | Wiesheu et al. | 48/197 R |
| 5,888,355 A | 3/1999 | Mikitenko et al. | 422/191 |
| 5,915,472 A | 6/1999 | Takikawa et al. | 165/158 |
| 5,938,800 A | 8/1999 | Verrill et al. | 48/127.9 |
| 5,989,503 A | 11/1999 | Wiesheu et al. | 422/198 |
| 6,033,793 A | 3/2000 | Woods et al. | 429/17 |
| 6,077,620 A | 6/2000 | Pettit | 429/26 |
| 6,123,913 A | 9/2000 | Clawson et al. | 423/652 |
| 6,126,908 A | 10/2000 | Clawson et al. | 422/190 |
| 6,179,048 B1 | 1/2001 | Shelton et al. | 165/134.1 |
| 6,232,005 B1 | 5/2001 | Pettit | 429/19 |
| 6,444,179 B1 | 9/2002 | Sederquist | 422/191 |
| 6,623,719 B2 | 9/2003 | Lomax et al. | 423/652 |
| 2004/0123523 A1 | 7/2004 | Rong et al. | 48/200 |
| 2005/0129593 A1* | 6/2005 | Hotta et al. | 422/198 |

FOREIGN PATENT DOCUMENTS

| | | |
|---|---|---|
| EP | 1 094 030 A2 | 4/2001 |
| EP | 1 094 030 A3 | 5/2002 |
| FR | 1274228 | 11/1960 |
| FR | 1480125 | 5/1965 |
| GB | 1387044 | 3/1975 |
| WO | WO 03/080230 A1 | 10/2003 |

OTHER PUBLICATIONS

Derwent Abstract No. 2001-106412/12 of JP 2000315517-A, published Nov. 4, 2000.

T. Krause et al., "Autothermal Reforming Catalysts," Abstracts from 2002 Fuel Cell Seminar, Nov. 18-21, 2002, Palm Springs, California, pp. 571-573.

S. Wieland et al., "New Catalysts for Autothermal Reforming of Gasoline and Water Gas Shift Reaction," Abstracts from 2000 Fuel Cell Seminar, Oct. 30-Nov. 2, 2000, Portland, Oregon, pp. 309-312.

D. Bloomfield, "Hydrocarbon Fuel Processing for Fuel Cell Power Plants," Abstracts from 2000 Fuel Cell Seminar, Oct. 30-Nov. 2, 200, Portland, Oregon, pp. 329-332.

Seki et al., "Development of Fuel Processing Systems for PEFC Residential Stationary Application," Abstracts from 2000 Fuel Cell Seminar, Oct. 30-Nov. 2, 2000, Portland, Oregon, p. 376-379.

J. Larminie and A. Dicks, Fuel Cell Systems Explained, Chapter 6 entitled "Medium and High Temperature Fuel Cells," pp. 124-127, published by John Wiley & Sons Ltd., Feb. 2001.

J. Larminie and A. Dicks, "Fuel Cell Systems Explained," Chapter 7 entitled "Fueling Fuel Cells," pp. 181-228, published by John Wiley & Sons Ltd., Feb. 2001.

* cited by examiner

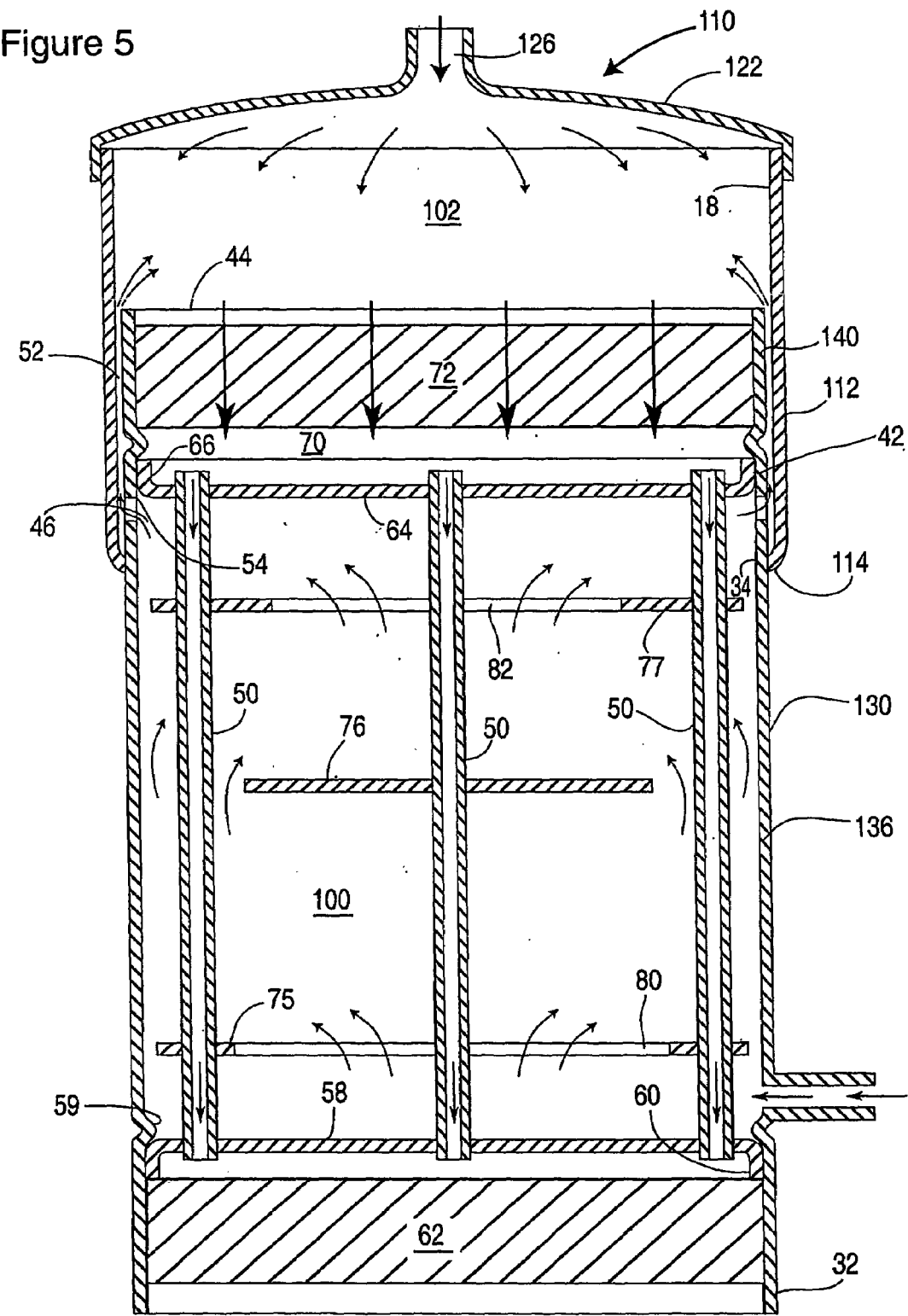

FUEL CONVERSION REACTOR

This application is the national stage application of, and claims priority to, International Application No. PCT/CA2003/002029 filed Dec. 31, 2003 the entire disclosure of which is incorporated herein by reference. The International Application was published in the English language on Jul. 15, 2004 as International Publication No. WO 2004/059232 A1 and itself claims the benefit of Canadian Patent Application No. 2,415,536, filed on Dec. 31, 2002, the entire disclosure of which is incorporated herein by reference.

FIELD OF THE INVENTION

This invention relates to fuel conversion reactors, and more specifically to burners and fuel reformers for use in fuel cell systems.

BACKGROUND OF THE INVENTION

The use of fuel cells has become of increasing interest in recent years for the application of power generation by means of a stationary installation and for purposes of transportation where the fuel cell is transported with the vehicle. The fuel of these fuel cells is commonly hydrogen that has been produced by reacting a hydrogen-containing fuel, usually a hydrocarbon or a low molecular weight alcohol, over one or more catalysts in a fuel reformer.

There are a number of known processes for generating hydrogen from hydrogen-containing fuels in a fuel reformer. A first known process for conversion of hydrogen-containing fuels to hydrogen is known as "steam reformation", which is conducted at elevated temperatures. In the case of a hydrocarbon fuel, steam reformation proceeds via the following reaction, which is generally endothermic:

$$C_nH_m + nH_2O \rightarrow nCO + (m/2+n)H_2.$$

One difficulty with steam reformation is that external heat may be required to drive the reaction forward to produce hydrogen and carbon monoxide. External heat can be supplied to the steam reformation catalyst from a number of sources, and is transmitted to the catalyst bed using heat exchangers. Some of the external heat may be supplied by passing the high temperature reformate produced by the catalytic steam reformation through a regenerative heat exchanger, thereby returning some of the heat of the high temperature gas to the endothermic reforming reaction. Alternatively, the external heat may be generated by combustion of anode off-gases and/or other fuels in a burner. The combustion reaction taking place in the burner can be catalyzed or non-catalyzed. Examples of catalytic and non-catalytic burners are described in U.S. Pat. No. 6,232,005 issued to Pettit.

A second known process for converting hydrogen-containing fuels to hydrogen is known as "partial oxidation", which proceeds via the following exothermic reaction:

$$C_nH_m + n/2 O_2 \rightarrow nCO + m/2 H_2.$$

Partial oxidation can be performed at high temperatures (about 1200 to 1500° C.) without a catalyst, or can be performed with a catalyst at much lower temperatures, typically about 500 to 800° C. One disadvantage of partial oxidation is that it produces less hydrogen per molecule of hydrogen-containing fuel than steam reformation, since some of the fuel is consumed by oxidation. Since the oxidation is exothermic, there is no need for the provision of external heat through a heat transfer surface.

A third known process for converting hydrogen-containing fuels to hydrogen is "autothermal reformation", in which fuel, water and oxygen, usually in the form of air, are reacted in the presence of a catalyst to generate a hydrogen-rich fuel gas. Autothermal reformation can be viewed as a combination of two reactions, an exothermic partial oxidation and an endothermic steam reformation, with the net heat of reaction being determined by the ratios of oxygen to fuel and water to fuel. Generally, these ratios are established so that the net heat of reaction is slightly exothermic, thereby eliminating the need for application of external heat, resulting in a relatively simple system design which makes autothermal reforming attractive for practical applications.

As can be seen from the chemical reactions depicted above, considerable amounts of carbon monoxide are produced during conversion of the hydrogen-containing fuel. To avoid poisoning of the fuel cell, the level of carbon monoxide in the reformate must be reduced to a low level. This is particularly true for proton exchange membrane (PEM) fuel cells, which have a low tolerance for carbon monoxide. Thus, the reformate is typically subjected to at least one "carbon monoxide cleanup" reaction, which preferably comprises one or more water/gas shift reactions and/or a preferential oxidation reaction, in which carbon monoxide present in the reformate is consumed in a catalytic reaction with oxygen or water (steam).

Regardless of the specific conversion process utilized, significant thermal stresses are exerted on fuel conversion reactors, which can have a detrimental effect on durability. Designers of such reactors have therefore sought to reduce thermal stresses in the mechanical design of these units.

There are two conventional design approaches to overcome the problem of thermal stress in a fuel conversion reactor. The first is to reduce the stress levels by permitting thermal expansion of components of the reactor, and the second is to increase the strength of the reactor structure or the materials used in the structure so that the maximum operating stress will not exceed the maximum design strength.

One well known type of heat exchanger that is used in a wide variety of applications including boilers and other high temperature heat exchangers is known as the "tube bundle" structure, also called a "shell and tube" heat exchanger. Reference can be made to sections 3.1.2. and 4.2.3 of the Heat Exchanger Design Handbook, 1998, by G. F. Hewitt for a discussion of this type of heat exchanger. There are a variety of such heat exchangers including a fixed tube sheet or fixed head type. In this type there is an exterior metal shell which can, for example, be cylindrical and mounted within this shell are two spaced apart tube sheets on which a number of tubes are mounted. There are head covers or complete heads or channel covers at each end, which serve as fluid manifolds. With such a heat exchanger, the thermal expansion coefficients of the shell and the tubes during operation can cause a differential movement between them. Excessive movement of this type can cause the tubes to loosen in the tube sheets. One known way for overcoming the problem of differential movements is to provide a shell expansion bellows.

U.S. Pat. No. 5,382,271 issued Jan. 17, 1995 to Industrial Technology Research Institute, describes a compact tube and shell structure for hydrogen generation where a catalyst is used in the water-shift reaction in order to reduce the level of carbon monoxide in the outflowing gases. Two tube sheets are mounted near opposite ends of a cylindrical shell and first and second sets of partition plates are mounted between the tube sheets. A plurality of tubes extend between the tube sheets and through the partition plates. There is a porous metal layer arranged immediately below the upper tube sheet and then catalyst material is arranged below this layer. There is an exhaust gas chamber and an exhaust outlet provided below the bottom tube sheet. Combustible gas flows into the shell body by means of an inlet in the upper end. A feed inlet is located in one side of the shell body just below the upper tube sheet. For certain types of hydrocarbons, a catalyst used for the steam reforming step is placed in the middle section while another catalyst used in the last section just above the bottom tube sheet is for the water-gas shift reaction.

With this known device, combustible gas enters the upper chamber formed in the shell above the upper tube sheet and, after combustion, the exhaust gas at a very high temperature passes through the tubes in order to enter an exhaust gas chamber at the bottom. The heat of the exhaust gas is transferred to the porous metal layer and the catalyst(s) while the exhaust gas passes through the tubes. This heat exchange also decreases the temperature of the exhaust gas. With this known hydrogen generator structure, there can be a thermal expansion problem if the tubes expand at a different rate than the shell as the tubes are apparently rigidly mounted in the tube sheets which in turn are rigidly mounted in the shell.

SUMMARY OF THE INVENTION

According to one aspect of the invention, the reactor comprises a fuel conversion reactor including a shell-and-tube heat exchanger for preheating a gaseous fluid prior to catalytic or non-catalytic reaction with a fuel. The heat exchanger includes a primary shell member having primary and secondary ends and a side wall extending between these ends and defining a heat exchanging chamber located within the shell member. There is an inlet for introducing the gaseous fluid into the heat exchanging chamber, a first tube sheet fixedly mounted on the primary shell member in the vicinity of the primary end and sealingly closing the heat exchanging chamber at one end of the chamber, and a second tube sheet device which is separate from the primary shell member and is located in the vicinity of the secondary end. The second tube sheet device forms another end of the chamber that is opposite the one end of the chamber. A plurality of heat exchange tubes extend from the first tube sheet to the second tube sheet device and are rigidly connected to both the first tube sheet and the second tube sheet device. These heat exchange tubes provide passageways for the gaseous mixture to flow inside the tubes through the heat exchanging chamber. One or more outlets are formed in at least one of the primary shell member and the second tube sheet device in the region of the secondary end of the primary shell member in order to provide at least one outlet for the gaseous fluid which flows through the heat exchanging chamber on a shell side thereof during operation of the fuel conversion reactor.

Preferably, the reactor includes an outer shell having first and second ends and an outer shell wall extending between these ends. The outer shell is closed at the second end, extends around the primary shell member and the second tube sheet device, and has an inlet for the fuel. A fuel passageway is formed between the outer shell wall and the side wall of the primary shell member and extends from the inlet for the fuel to the one or more outlet apertures.

Preferably, the second tube sheet device includes a secondary shell member having a peripheral side wall with a first end of the secondary shell member located adjacent the secondary end of the primary shell member. The first end of the secondary shell member and the secondary end of the primary shell member form a disconnected joint and thus the second tube sheet device is free to move relative to the primary shell member upon thermal expansion of the heat exchange tubes.

According to another aspect of the invention, a method of converting a fuel to a hot gaseous mixture comprises providing a heat exchanging shell apparatus defining a heat exchanging chamber and having a plurality of heat exchange tubes mounted therein so that each extends through said chamber, these tubes providing passageways for flow of the hot gaseous mixture. A gaseous fluid to be reacted with the fuel is introduced into the heat exchanging chamber and passes through the chamber, thereby causing the gaseous fluid to be heated by heat exchange with the hot gaseous mixture flowing through the tubes. The heated gaseous fluid is withdrawn from the chamber and is mixed with the fuel to provide a mixture of the fuel and the gaseous fluid. This initial mixture is reacted, optionally in the presence of a catalyst, to produce the hot gaseous mixture.

In some preferred embodiments of the invention, the reactor comprises a burner in which the fuel undergoes a catalytic or non-catalytic combustion reaction with a gaseous fluid containing oxygen, thereby producing a hot, gaseous mixture of combustion gases from which usable heat may be extracted.

In other preferred embodiments of the invention, the reactor comprises a fuel reformer in which a hydrogen-containing fuel undergoes a fuel transformation reaction with a gaseous fluid to produce a hot gaseous mixture containing hydrogen which may, for example, be utilized in a fuel cell engine. The fuel transformation reaction may preferably comprise a steam reformation, catalytic or non-catalytic partial oxidation, or an autothermal reformation process, with autothermal reformation being particularly preferred for the reasons mentioned earlier. The gaseous fluid to be reacted with the hydrogen-containing fuel preferably contains water or steam and/or an oxidant such as molecular oxygen (referred to herein as "oxygen"), depending on the fuel transformation reaction used. With the exception of non-catalytic partial oxidation, the gaseous fluid and the hydrogen-containing fuel are reacted in the presence of a suitable catalyst.

In yet another aspect, the present invention provides in a fuel conversion reactor, a shell-and-tube heat exchanger for heating a gaseous fluid prior to reaction with a fuel and for cooling a gaseous mixture produced by the reaction, said heat exchanger comprising: (a) a first heat exchanger section comprising: (i) a first primary shell member having primary and secondary ends and a sidewall extending between said ends and defining a first heat exchanging chamber located within the first shell member; (ii) a first tube sheet fixedly mounted on said primary shell member in the vicinity of said primary end and sealingly closing said first heat exchanging chamber at one end of the first chamber; (iii) a second tube sheet device which is separate from said primary shell member and is located in the vicinity of said secondary end, said second tube sheet device forming another end of said first chamber that is opposite said one end of the first chamber; and (iv) a plurality of heat exchange tubes extending from said first tube sheet to said second tube sheet device and rigidly connected to both the first tube sheet and the second tube sheet device, said heat exchange tubes providing passageways for said gaseous mixture to flow inside the tubes through said first heat exchanging chamber; and (v) one or more outlet apertures formed in the region of said secondary end of said primary shell member in order to provide at least one outlet for said gaseous fluid which flows through said first heat exchanging chamber on a shell-side thereof during operation of said fuel conversion reactor; and (b) a second heat exchanger section comprising: (i) a second primary shell member having primary and secondary ends and a sidewall extending between said ends and defining a second heat exchanging chamber in communication with the first heat exchanging chamber, the second shell member being concentric with the first shell member with the primary end of the first shell member being located proximate the secondary end of the second shell member; (ii) a plurality of heat exchanging tubes mounted in the second shell member and communicating with the heat exchange tubes of the first heat exchanger section; (iii) an inlet in the sidewall of the second shell member for introducing the gaseous fluid into the second heat exchanging chamber; (iv) one or more outlet apertures formed in the region of the secondary end of the second shell member to provide at least one outlet for the gaseous fluid to flow from the second heat exchanging chamber to the first heat exchanging chamber.

BRIEF DESCRIPTION OF THE DRAWINGS

Further features and advantages will become apparent from the following detailed description of preferred embodiments of the invention taken in conjunction with the accompanying drawings, in which:

FIG. 5 is an axial cross-section of an alternate embodiment of a fuel conversion reactor, comprising a fuel reformer wherein the fuel is not preheated by the reformer itself;

DETAILED DESCRIPTION OF PREFERRED EMBODIMENTS

The preferred fuel conversion reactors according to the invention are described below as fuel reformers. However, it will be appreciated that any of the preferred structures described below may be equally suitable, with minor modifications, for use as catalytic or non-catalytic burners.

Figure 1:
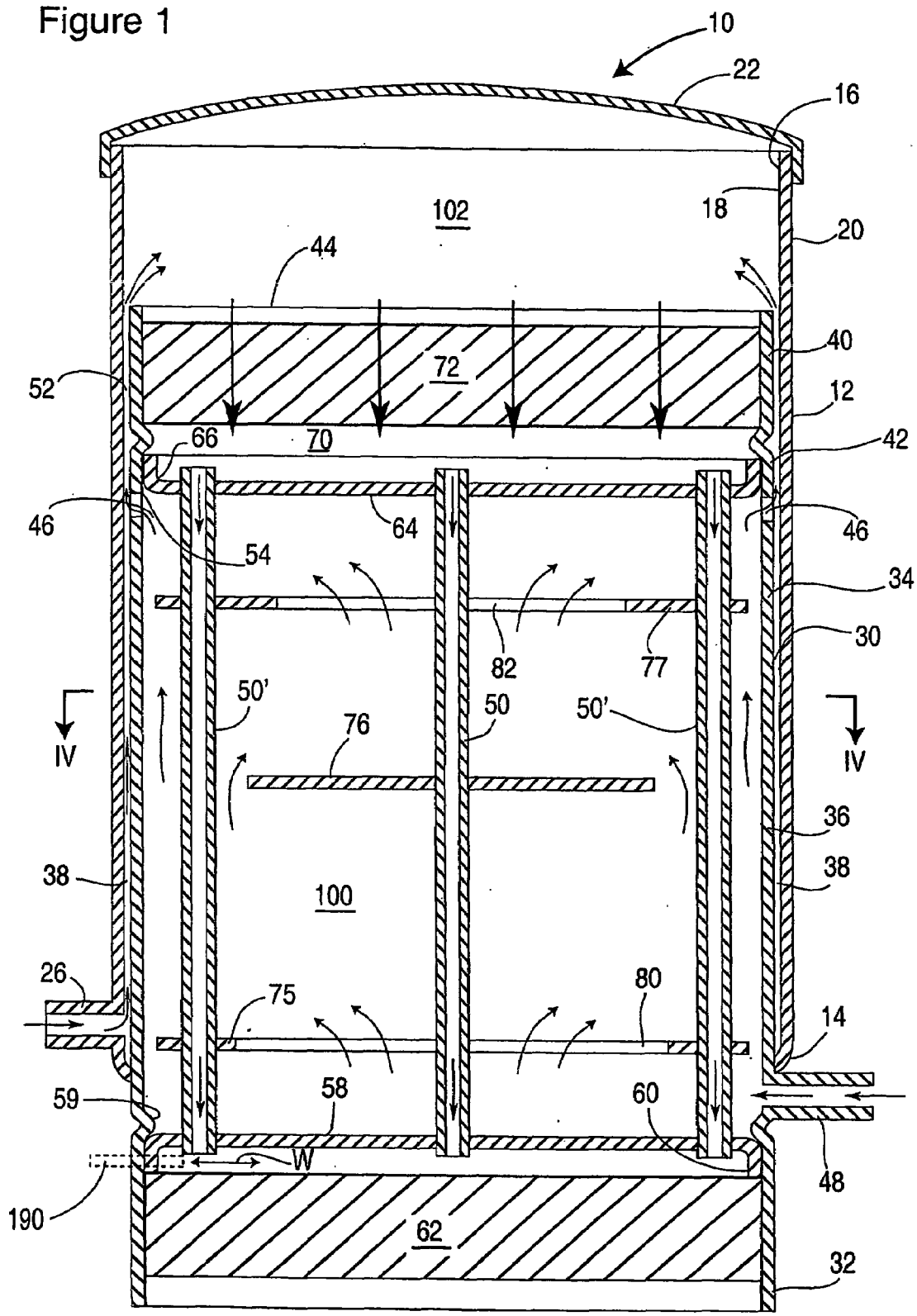
FIG. 1 is an axial cross-section of a preferred form of fuel conversion reactor, comprising a fuel reformer constructed in accordance with the invention.

FIG. 1 illustrates a first preferred fuel reformer 10 according to the invention, which is constructed for the purpose of converting hydrogen-containing fuel to hydrogen gas by means of an autothermal reformation process in which a gaseous fluid containing steam and oxygen or an oxygen-containing gas such as air undergoes a catalyzed reaction with a hydrogen-containing fuel. Where the hydrogen-containing fuel comprises a hydrocarbon, the following catalyzed reactions take place in the fuel reformer 10:

(1) Partial Oxidation (exothermic)

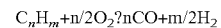
$C_nH_m + n/2 O_2 \rightarrow nCO + m/2 H_2$ (2) Steam Reformation (endothermic)

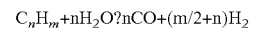
$C_nH_m + nH_2O \rightarrow nCO + (m/2+n)H_2$

As mentioned above, the two steps of the autothermal reformation take place in the fuel reformer 10 without spatial separation, and preferably take place simultaneously in the same catalyst bed or structure.

Figure 2:
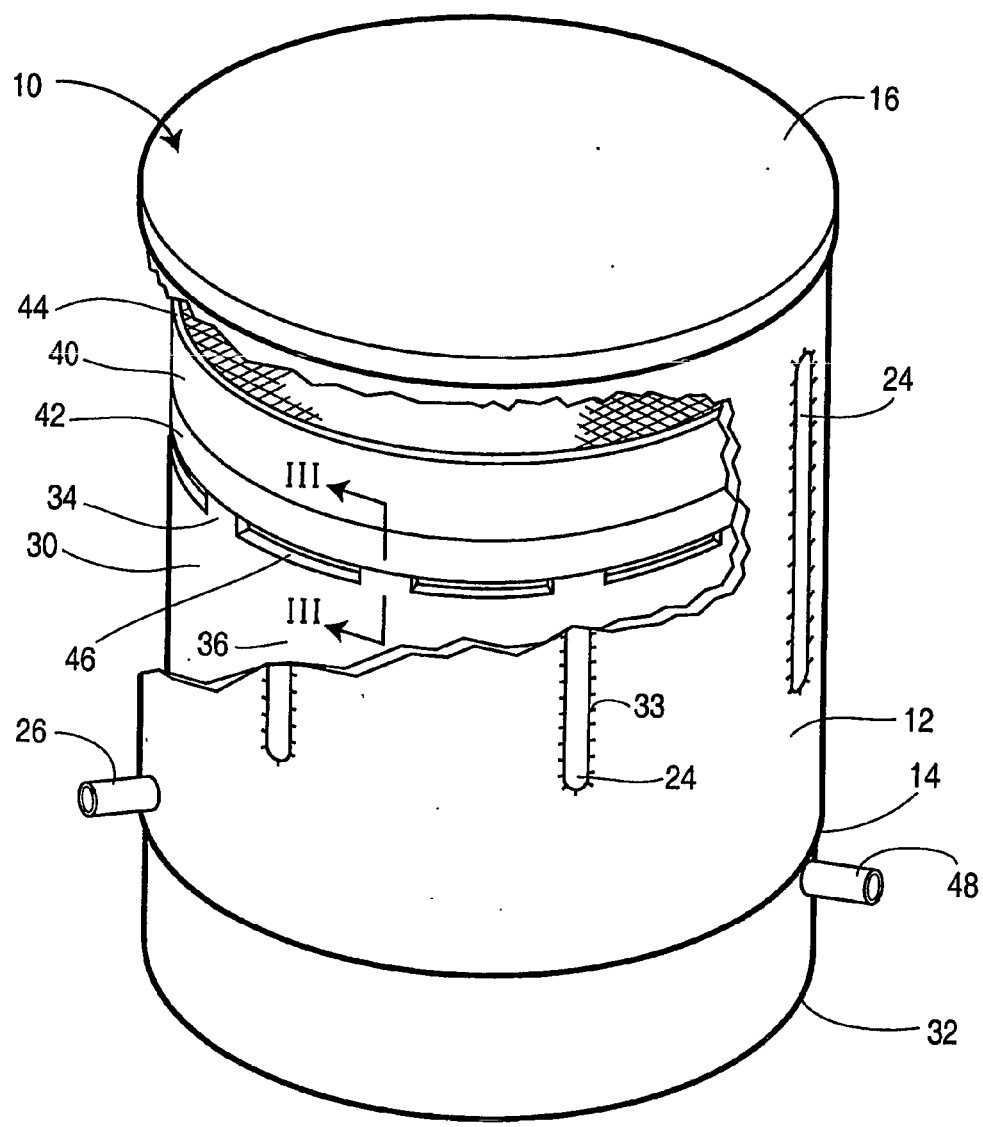
FIG. 2 is a perspective view showing one side of and the top of the fuel reformer of FIG. 1, this view having the outer shell partially broken away in order to illustrate details of the inner shells.
Figure 4A:
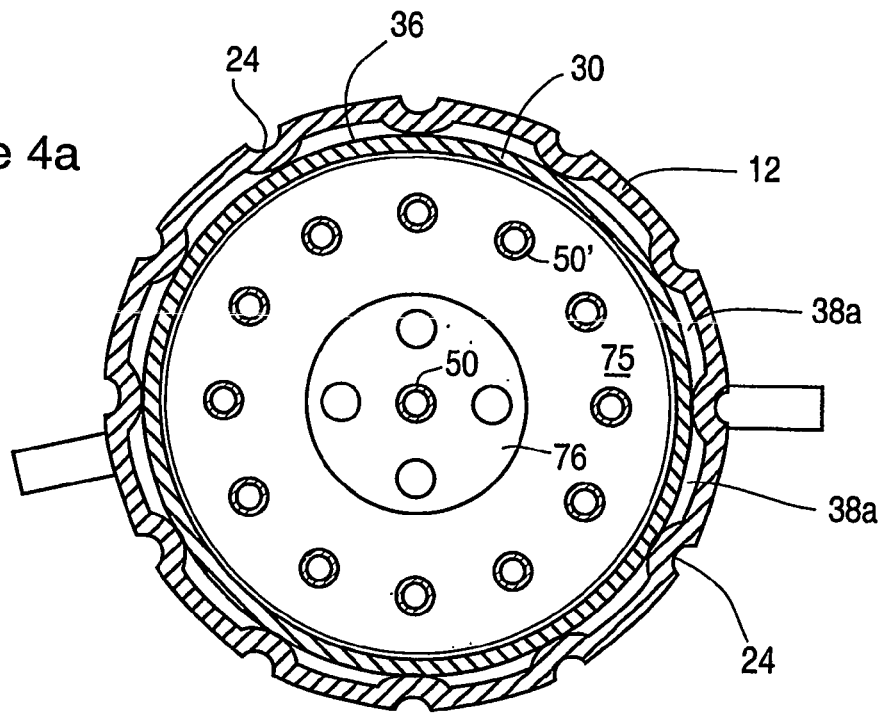
FIGS. 4a and 4b are horizontal cross-sections taken along the line IV—IV of FIG. 1.

The preferred illustrated reformer 10 includes an outer shell 12 having a first end 14 and a second end 16. The shell has a cylindrical inner surface 18 and a cylindrical external surface 20 which extend between the first and second ends. The second end is closed by means of a top cap member 22 which is fixedly attached to the cylindrical, main body of the outer shell. As shown in FIGS. 2 and 4a, there are inwardly extending projections in the form of longitudinally extending ribs 24 formed in the outer shell and these are provided for the purpose explained hereinafter. The bottom ends of the ribs are spaced away from the bottom or first end 14 of the outer shell.

Figure 12:
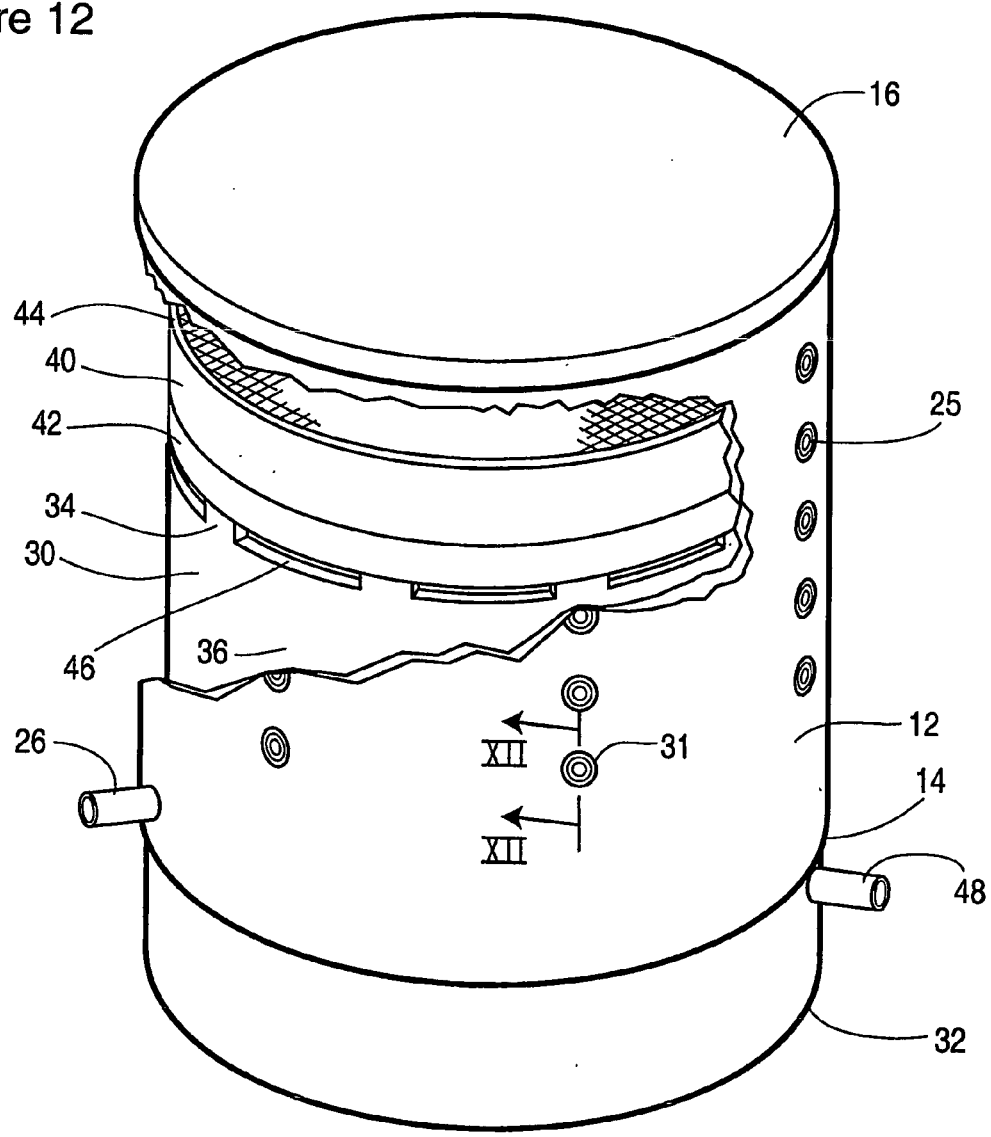
FIG. 12 is a perspective view similar to FIG. 2 but showing an alternate form of projections on the outer shell.
Figure 13:
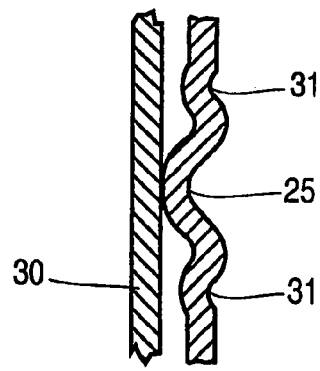
FIG. 13 is a cross-sectional detail taken along the line XII—XII of FIG. 12, this view showing the use of annular corrugations around a dimple projection.

An alternate construction of the fuel reformer 10 is illustrated in FIGS. 12 and 13. This embodiment is the same as that shown in FIG. 2 except that the outer shell 12 has inwardly extending projections in the form of round dimples 25, which serve the same purpose as the ribs 24. As shown in FIG. 12, the dimples 25 may be arranged in longitudinally extending rows, although other arrangements are possible.

Although the illustrated dimples are round, obviously other shapes such as elliptical or oblong are also possible. In order to allow for thermal expansion of a primary inner shell 30 relative to the outer shell 12, each dimple may preferably be surrounded by one or two annular corrugations 31 which will allow the inner end of the dimple to be pushed outwardly by the inner shell 30 as it expands, although other arrangements are possible. In a similar manner, the ribs 24 in the embodiment of FIG. 2 can also be surrounded by one or two corrugations 33 for the same purpose. Another alternative construction is to provide the ribs or dimples on the primary inner shell 30 (and also on a secondary inner shell 40 described below), in which case the ribs or dimples project outwardly to engage the inner surface of the outer shell 12.

Figure 4B:
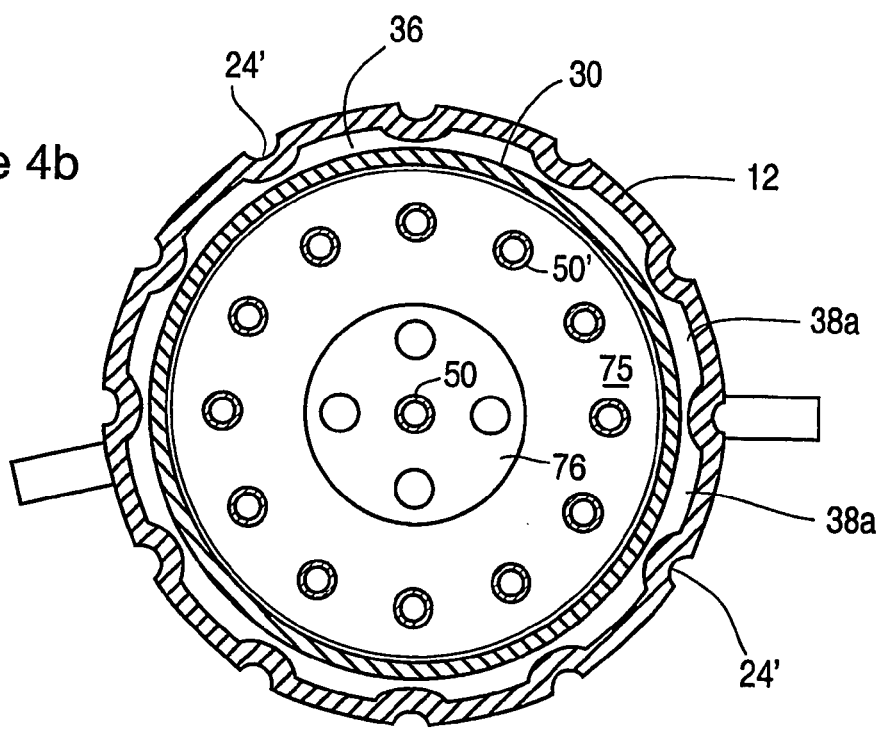

FIG. 4b illustrates an alternative to the use of corrugations 33. In FIG. 4b, the outer shell 12 is provided with inwardly extending ribs 24' of reduced height, such that the primary inner shell 30 is not in contact with some or all of the ribs 24' before the reformer 10 has reached operating temperature. As the reformer heats up and the inner shell expands outwardly, it preferably makes contact with at least some of the ribs 24', thereby centering the inner shell 30 within the outer shell 12 as in FIG. 4a. It will be appreciated that this type of arrangement could also be used in the type of reformer in which ribs 24 are replaced by dimples 25.

A first inlet 26 for the hydrogen-containing fuel is formed in the outer shell in the vicinity of the first end 14. It will be understood that this inlet is connected by a suitable hose or pipe (not shown) to a supply of hydrogen-containing fuel which can be any one of a variety of types suitable for hydrogen production. For example, the hydrogen-containing fuel may comprise a hydrocarbon fuel selected from one or more petroleum fractions such as gasoline, naphtha, kerosene, diesel fuel, etc.; natural gas or one or more components thereof, including methane, ethane, propane, etc. Alternatively, the hydrogen-containing fuel may comprise one or more alcohols such as methanol and ethanol. Preferred hydrocarbon fuels are gasoline and methane. The flow of fuel through the inlet 26 can be controlled by any suitable means, such as by a throttle or control valve, to meet the fuel cell engine load demand.

Extending into the outer shell is the primary inner shell 30 which has a primary end 32 and a secondary end 34. An outer surface 36 extends between the primary and secondary ends. It will be understood that the primary inner shell 30 is rigidly attached to the outer shell 12 at the first end 14 of the outer shell. The two shells can be attached at this location by welding or brazing. It will be seen that the inner shell 30 extends into the open first end 14 of the outer shell and projects a substantial distance into the outer shell. A fuel passageway 38 is formed between the outer surface 36 of the inner shell and the inner surface 18 of the outer shell and extends longitudinally from the inlet 26 to the secondary end 34 of the primary inner shell. When the aforementioned ribs 24 are formed on the outer shell, the fuel passageway 38 can comprise a plurality of separate sub-passageways 38a as illustrated in FIG. 4a. Since the ribs do not extend all of the way down to the level of the inlet 26, the bottom ends of these sub-passageways are interconnected to permit the fuel to flow completely about the inner shell and then upwardly through all of the sub-passageways. The location and shape of the ribs may be varied from that shown in FIG. 2. One skilled in the art will appreciate that the ribs or the dimples can be arranged so as to provide uniform flow distribution around the circumference of the shell to the maximum extent possible.

The preferred reformer 10 also has a secondary inner shell 40 which has a first end 42 located adjacent the secondary end 34 of the primary inner shell. The inner shell 40 also has a second end 44 spaced from the first end 42 and located away from the top or second end 16 of the outer shell. The preferred secondary inner shell 40 is also cylindrical like the inner shell 30 and it has the same external diameter. The secondary inner shell 40 can be substantially lower in height compared to the primary inner shell 30. At least one and preferably a plurality of outlet apertures 46 are formed between the primary inner shell 30 and the secondary inner shell 40 or in one of these two shells and are provided for passage of the gaseous fluid out of the primary inner shell.

As mentioned above, the gaseous fluid may preferably comprise a mixture of steam and air, with the relative concentrations of air and steam in the gaseous fluid preferably being adjustable by external means to permit the reformer to operate under a variety of conditions. For example, during start-up of the reformer, the gaseous fluid may be comprised entirely or primarily of air, resulting in catalytic combustion of the hydrogen-containing fuel and rapidly heating the reformer and the catalyst(s) to a predetermined temperature. Once the temperature reaches a sufficient level, the concentration of steam in the gaseous fluid is increased, thereby increasing the hydrogen output of the reformer.

The gaseous fluid enters the primary inner shell through a second inlet 48 provided in a side of the primary inner shell 30 in the vicinity of the primary end 32. It will be understood that the inlet 48 is connected by means of a suitable hose or pipe (not shown) to a source or supply providing the gaseous fluid. For example, a mixture of steam and air can be provided by a suitable boiler of standard construction. Though it is possible to extend the outer shell 12 downwardly from the position shown in FIGS. 1 and 2 so that it is adjacent the primary end 32 of the inner shell, it is preferable to terminate the outer shell just above the inlet 48. This simplifies the structure of the reformer and helps to reduce thermal stress. Also, by this construction, one avoids the need to pass the inlet 48 through the walls of two shells. It will be understood that the amount of the gaseous fluid delivered through the inlet 48 can be made proportional to the amount of fuel being delivered to the reformer, with means preferably being provided outside the reformer to control the composition of the gaseous fluid.

The illustrated apertures 46 of FIG. 2 are elongate in the circumferential direction but are relatively short in the axial direction. As will be seen hereinafter, the outlet apertures can become larger in size and can become interconnected as a result of longitudinal thermal expansion of heat exchange tubes 50 mounted in the reformer. The apertures 46 of FIG. 2 are formed by castellations in the secondary end 34 of the primary inner shell 30. However, it will be appreciated that the apertures may instead be formed by scallops or other shapes provided at the secondary end 34 of shell 30.

A further passageway 52 is formed between the secondary inner shell 40 and the outer shell 12 and extends from the first end 42 to the second end 44 of the secondary inner shell. Because the gaseous fluid flows out through outlets 46, it is mixed with the fuel just outside of the apertures and thus a mixture of the fuel and the gaseous fluid flows through the further passageway 52 during use of the reformer. It is also possible to consider the passageway 52 an extension of the passageway 38. As will be seen from FIG. 2, the ribs 24 can extend up to the location of the secondary inner shell 40 and thus the passageway 52 can also comprise a number of sub-passageways that extend vertically as seen in FIGS. 1 and 2. It will be seen that the ribs 24 (and the dimples 25 of the embodiment of FIGS. 12 and 13) function to properly center the two inner shells within the outer shell and hold the inner shells in the correct position and to strengthen the overall structure.

Figure 3:
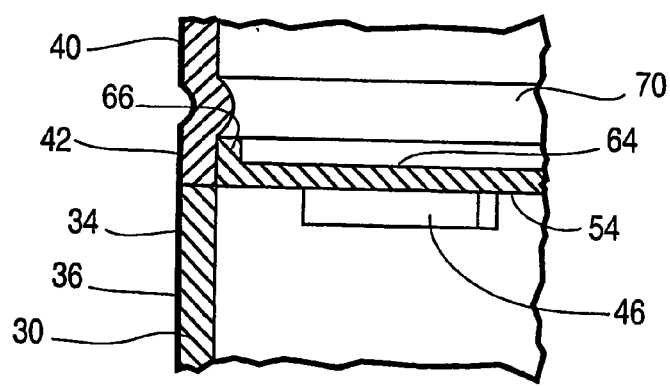
FIG. 3 is a cross-sectional detail taken along the line III—III of FIG. 2, this view showing the disconnected joint between the two inner shells.

As illustrated in FIG. 1 and more clearly shown in FIG. 3, the secondary end 34 of the primary inner shell and the first end 42 of the secondary inner shell preferably form a disconnected joint at 54. Because the two inner shells are not connected at this joint, the secondary inner shell 40 is free to move relative to the primary inner shell 30 upon longitudinal thermal expansion of the aforementioned heat exchange tubes 50. Thus, the structure according to the invention accommodates thermal expansion of the heat exchange tubes without increasing the gauge of the metal components and without resorting to the use of exotic materials. As well, the structure according to the invention is compact and provides for integrated preheating of the fuel and/or the gaseous fluid, thereby providing benefits in terms of improved energy efficiency. As well, the structure of the reactor is adaptable to formation of compact, integrated structures in which both fuel transformation and carbon monoxide cleanup reactions can be performed.

A first tube sheet 58 is fixedly mounted to the primary inner shell 30 in proximity to the primary end 32 and this sheet sealingly closes off the primary inner shell. This first tube sheet is preferably formed with a circumferential flange 60 for attachment and sealing purposes. Although the first tube sheet 58 is shown in the drawings as being circular, it will be appreciated that it may be of any suitable shape, for example oval, elliptical, rectangular, hexagonal, or any other multi-faceted shape, depending on the shape of the primary inner shell 30. The tube sheet is formed with a number of holes to receive the ends of an equal number of tubes 50 which can be rigidly attached to this tube sheet. The tubes 50 and the holes in tube sheet 58 are preferably, but not necessarily, circular. The tube sheet 58 can also be considered a bottom header of the reformer. The perimeter of the tube sheet can be attached to the inner surface of the inner shell 30 by any suitable known means including brazing and welding.

As shown in FIG. 1, the primary inner shell 30 may be formed with an inwardly extending circumferential "lip" 59, or other inwardly extending indentation(s), such as dimples, to correctly locate the first tube sheet 58 relative to the primary end 32 of the primary inner shell 30, and to form a bottom chamber to receive a catalyst 62. In the bottom chamber, a space sufficient in size is formed between the catalyst 62 and the first tube sheet 58 to ensure that the catalyst receives a uniform flow of reformate from tubes 50. In addition, a water or steam insertion or mixing device may be inserted into the space to provide water for the reaction taking place in catalyst 62. This is discussed more fully below in the context of FIG. 1.

The reformer also includes a second tube sheet 64 fixedly connected to the secondary inner shell 40 and sealingly closing the interior of the secondary inner shell. Again, the preferred tube sheet 64 has a circumferential flange 66 which can be brazed or welded to the inner surface of the inner shell 40 adjacent the first end 42. It will be understood that the second tube sheet also has a plurality of holes, preferably circular in shape, formed therein to receive the adjacent ends of the tubes 50 and this tube sheet can be rigidly connected to the ends of the tubes. In the illustrated preferred embodiment, the inner shell 40 is formed with a circumferential lip 70 that projects inwardly. This lip can help correctly locate the tube sheet 64 and it can also locate and support a first catalyst 72 for the fuel transformation reaction. As shown in FIG. 1, the first catalyst is preferably mounted within the secondary inner shell 40 and also within the outer shell 12 in the region of the second end 16. This catalyst 72 is preferably an autothermal reformation catalyst arranged for contact with the mixture of the fuel and the gaseous fluid comprising steam and air in order to produce the hot gaseous mixture.

A plurality of the aforementioned heat exchange tubes 50, only some of which are shown in FIG. 1 for ease of illustration, extend from the first tube sheet 58 to the second tube sheet 64. These heat exchange tubes form passageways for the aforementioned hot gaseous mixture to flow from the first catalyst 72 through the second tube sheet 64, then through the first tube sheet 58 and then to the catalyst 62, sometimes referred to hereinafter as the second catalyst.

The second catalyst 62 is preferably a suitable catalyst for use in a "carbon monoxide cleanup" which, as described above, comprises either a water/gas shift reactions (3) and/or a preferential oxidation reaction (4), as follows:

(3) Water/Gas Shift (exothermic)

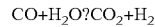

(4) Preferential Oxidation (exothermic)

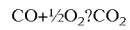

Preferably, the second catalyst is a shift reaction catalyst, and more preferably a high temperature shift reaction catalyst. If a water/gas shift reaction is to be the second catalytic reaction then water or steam can be introduced into the fuel reformer at a point just below the tube sheet 58 and above the catalyst 62. This possibility is indicated in FIG. 1 by the short inlet pipe 190 shown in dashed lines and the arrow labeled W. Although not shown in FIG. 1, it will be appreciated that a mixing device will preferably be received inside the bottom chamber between the tube sheet 58 and catalyst 62. The mixing device is attached to the end of water inlet pipe 190 and ensures even distribution of the injected water or steam within the reformate for reaction in the catalyst 62. The mixing device effectively shortens the length of the space between tube sheet 58 and catalyst 62 which would otherwise be required to achieve reasonable flow mixing and distribution of the injected steam or water.

The primary inner shell 30 is preferably open at its primary end 32 as illustrated so as to allow outflow of the reformate. Alternatively, a smaller outlet opening for the reformate can be formed at the bottom end 32 of the inner shell and this outlet can be connected to one or more reactors in which the amount of carbon monoxide in the reformate is further reduced to an acceptable level, which may be less than 50 ppm depending on the type of fuel cell being utilized. Where, for example, the carbon monoxide cleanup reaction conducted with the second catalyst 62 comprises a high temperature shift reaction, the reformate may preferably be subjected to one or more additional shift reactions downstream of the reformer 10, including at least one low temperature shift reaction, and/or the reformate may be subjected to preferential oxidation downstream of the reformer 10. After removal of carbon monoxide, the resulting hydrogen gas product can be piped to a fuel cell, if desired.

The catalyst material 62 or 72 can be supported on various types of structures. The support structure may comprise one or more corrosion and heat resistant materials such as ceramics or refractory materials, and is in a form which promotes contact between the flowing gases and the catalyst material within the reformer. Examples of support materials include magnesia, alumina, silica and zirconia, and mixtures thereof, and the support structure may be in the form of beads or grids, for example extruded ceramic monolith grids. In the alternative, the catalyst support or the catalyst itself may comprise a corrugated, rolled metal foil which is mechanically assembled into the inner shell section. The corrugated foil may, for example, be in the form of a slit and convoluted shape, such as a turbulizer. Where a metal foil is used, it is mounted in a manner known per se, so that it will not vibrate but which allows thermal expansion under the high temperature operating conditions of the catalyst. In an alternative arrangement, some or all of the first catalyst may be contained inside heat exchange tubes 50, for example the catalyst material may be supported on the inner surfaces of the tubes 50 and/or on turbulizers contained within the tubes 50. Regardless of the form of the catalyst material or the support structure, the catalyst material is arranged so as not to unduly restrict the flow of the fuel/gas mixture through the reformer. This arrangement of the catalysts (and as illustrated) allows the reformer to be quite compact and reduces the overall length requirements substantially.

Preferably there are mounted on the tubes 50 a number of baffle plates such as illustrated baffle plates 75, 76, 77. As shown in FIGS. 1, 4a, 4b and 5, the edges of these plates are preferably in close proximity to, but not connected to the inner shell, and are rigidly connected to at least one and preferably a plurality of the tubes. One reason for connecting the baffle plates to the tubes is to make the assembly process easier. The baffle plates are preferably not connected to the inner shell so that the tubes 50 may expand longitudinally relative to the inner shell.

The plates 75, 76, 77 are formed with openings, preferably circular in shape, through which the tubes 50 extend. The lowermost baffle plate 75 is annular and has a large central opening 80 formed therein. The outermost tubes 50' extend through the plate 75 near their bottom ends. The uppermost baffle plate 77 is also annular and has a large central opening 82, with the outermost tubes 50' extending through plate 77 near their top ends. The diameters of the uppermost baffle plate 77 and lowermost plate 75 are preferably such that there is no substantial flow of gases through the gap between the edges of plates 75, 77 and the primary inner shell 30. The gap preferably does not exceed 1 mm. It will be appreciated that the gap between plates 75, 77 and the primary inner shell 30 is exaggerated in the drawings.

Baffle plate 76 is located between the bottom baffle plate 75 and the top baffle plate 77 and a number of centrally located tubes 50 can extend through this plate although only one is shown in FIG. 1. In contrast to the lowermost and uppermost baffle plates 75, 77, plate 76 does not have a large central opening for passage of gases. Instead, plate 76 has a diameter such that a relatively large gap exists between the edges of plate 76 and the primary inner shell 30, thereby encouraging flow of gases around the edges of plate 76. In this way, the baffle plates 75, 76, 77 act to force the upflowing gaseous fluid to flow in a sinuous or winding manner to enhance the heat exchange process, and to establish a good annular flow distribution for ejection through the outlet openings 46. As shown by the curved arrows passing through the central opening 82 of top baffle plate 77 in FIG. 1, the gaseous fluid passing through the top baffle plate 77 flows radially outwardly toward outlet openings 46. As it passes through the openings 46, the gaseous fluid is uniformly mixed with the axially flowing hydrogen-containing fuel, in preparation for good radial flow distribution of the mixed fluids prior to entering catalyst bed 72.

It will be appreciated that there may be more than three baffle plates in the heat exchanger, and that the baffle plates do not necessarily have a circular or annular shape as shown in the drawings. Rather, the plates can have any configuration which will enhance the heat exchange process while maintaining adequate flow distribution.

It will be understood that the upward flowing steam and air is heated by the downward flowing reformate passing through the tubes 50. As a result of this exchange, the reformate is cooled as it passes downwardly through the tubes. Since the temperature of the reformate is much higher than the mixture of steam and air, the thermal expansion of the tubes is much longer than the expansion of the inner shell 30. However, because the secondary inner shell 40 is free to move relative to the primary inner shell 30, the greater expansion of the tubes 50 is accommodated and thus there is no build up of thermal stress which could otherwise break the joint between the tubes and one or both of the headers or the joint between the headers and the inner shell. It will also be seen that because of the thermal expansion of the tubes, the outlet apertures 46 vary in size during operation of the fuel reformer and these outlet apertures in fact become larger as the length of the tubes 50 increases, thereby reducing the aperture flow resistance to effect either a sustained or increased flow of gaseous fluid out of the primary inner shell. This has the advantage of allowing a faster reforming process as the reformer achieves optimum operating temperatures. It should be noted that the gases flowing through the reformer are less dense as their temperature rises and the increased aperture size may partly compensate for this.

It will be understood that in the preferred, illustrated fuel reformer, there is a hydrogen-containing fuel mixture delivery arrangement which is adapted to deliver a mixture of the hydrogen-containing fuel and the gaseous fluid (comprising steam and air) to the first catalyst 72. Although this hydrogen-containing fuel mixture delivery arrangement can take various forms, in the preferred illustrated embodiment of FIGS. 1 and 2, this arrangement comprises the aforementioned outer shell member 12 that extends around the primary and secondary shell members and is rigidly connected to the primary shell member. It will be appreciated, for example, that the incoming hydrogen-containing fuel can be heated by means other than that illustrated in FIGS. 1 and 2, for example by means of heat exchange with the hot mixture of steam and air passing through the heat exchanging chamber 100. In another alternative construction shown in FIG. 5, the fuel could simply be introduced directly into the upper chamber 102 where it can mix with the hot mixture of steam and air passing out of the outlet apertures 46. The upper chamber 102 can be considered an enclosed mixing chamber that is adjacent the first catalyst 72. Although the fuel is not preheated inside the reformer of FIG. 5, to it may be preheated elsewhere in the system. The fuel reformer shown in FIG. 5 may be the preferred configuration in terms of safety since the fuel and the oxygen-containing gas are combined immediately before they reach the catalyst 72.

The combination of the secondary inner shell 40 and the second tube sheet 64 can be considered a second tube sheet device which is separate from the primary shell member 30 and which is located in the vicinity of the secondary end 34. This second tube sheet device forms one end of the heat exchanging chamber 100. As illustrated, one end of the second tube sheet device which includes the secondary shell member 40 is located adjacent the secondary end 34 of the primary shell member.

If desired, a turbulizer, which per se is of known construction, can be inserted into the passageway 52 in order to ensure a very good mixing of the fuel and the steam and air. It will be understood that this turbulizer is annular in shape and extends about the circumference of the secondary inner shell 40.

The sheet metal from which these fuel reformers are made must have a sufficiently high melting point, elevated temperature strength, and oxidation resistance in order to achieve the necessary durability. Typical materials that can be used to construct this reformer include austenitic or ferritic stainless steel, Inconel™, and other nickel or alloy steel materials. The gauge of the sheet metal will depend on the design of the particular reformer system but can typically range from 0.5 mm to 4 mm for low to moderate life requirements, or the gauge can be doubled over this range for large or extended life applications (for example, stationary power). The size of the fuel reformer of this invention can vary depending upon its intended use, it being understood that it is generally desirable to reduce the weight and space requirements of the reformer while maintaining the desired durablility.

For purposes of initial start-up of the illustrated fuel reformer, a separate vaporizer (not shown) can be used to heat and vaporize the fuel such as gasoline so that the initial exothermic autothermal reformation can commence. Once this reaction commences, because of the heat created by the autothermal reformation process, the temperature of the system at the catalyst 72 will increase quickly.

It may also be possible to use the gaseous fluid exiting the chamber 100 to heat up the small amount of fuel that is used initially and thereby achieve a mixture temperature which is sufficiently high to start or facilitate the start of the autothermal reformation reaction. If desired, a catalytic or non-catalytic burner can be used to heat the gaseous fluid, at least for purposes of a cold start-up of the reformer.

The alternate fuel reformer 110 shown in FIG. 5 also differs from fuel reformer 10 in that the outer shell 112 is substantially shorter than the outer shell 12 in reformer 10. The outer shell 112 terminates at a first or bottom end 114 which can be just below the apertures 46. The outer shell is closed by means of a top cap member 122 which, unlike the cap member in the first embodiment, is formed with a central inlet 126 for the flow of hydrogen-containing fuel into the reformer. As already discussed above, the fuel therefore flows directly into the upper chamber 102 where it is mixed with the gaseous fluid immediately before passing through the first catalyst 72. For some applications, the fuel can enter the chamber 102 unheated or the fuel can be preheated elsewhere by suitable known heating means (not shown). Extending into the outer shell 112 is a primary shell 130 which can be similar in its construction to the primary inner shell 30 of the first embodiment. The shell 130 has an outer surface 136 which extends between the primary end 32 and the secondary end 34. The primary shell 130 is rigidly attached to the outer shell 112 at the first end 114 by means of welding or brazing. In this embodiment the primary shell 130 extends only a short distance into the outer shell. The fuel reformer 110 also has a secondary shell 140 which is located within the outer shell 112. This secondary shell can be similar in its construction to the secondary shell 40 of the first embodiment. There is a passageway 52 formed between the secondary shell 140 and the outer shell 112 and in a preferred embodiment it is a mixture of steam and air which passes upwards through this passageway to the mixing chamber 102. In this embodiment there is also a disconnected joint at 54 formed between the secondary end 34 of the primary shell 130 and the first or bottom end 42 of the secondary shell 140.

Figure 6:
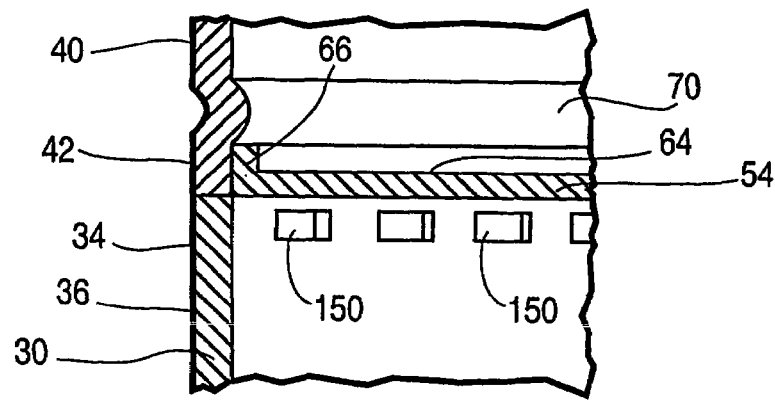
FIG. 6 is a cross-sectional detail similar to FIG. 3 but showing another form of outlet apertures formed in the primary inner shell.

It will be appreciated by those skilled in this art that the outlet apertures formed in the region where the primary inner shell 30 meets the secondary inner shell 40 can be provided in various forms and some of these alternatives are illustrated in FIGS. 6 to 10 of the drawings. As illustrated in FIG. 6, a plurality of outlet apertures 150 can be formed in the primary inner shell 30 a short distance below the secondary end 34. These apertures can be is rectangular as shown or they can be other shapes such as circular or elliptical. Preferably these apertures are distributed evenly about the circumference of the inner shell 30 and preferably the outlet apertures are all of similar or identical size. It will be understood that a butt joint or disconnected joint 54 is still provided in this embodiment, and may be used alone or in conjunction with additional apertures as shown in FIGS. 6 to 10.

Figure 7:
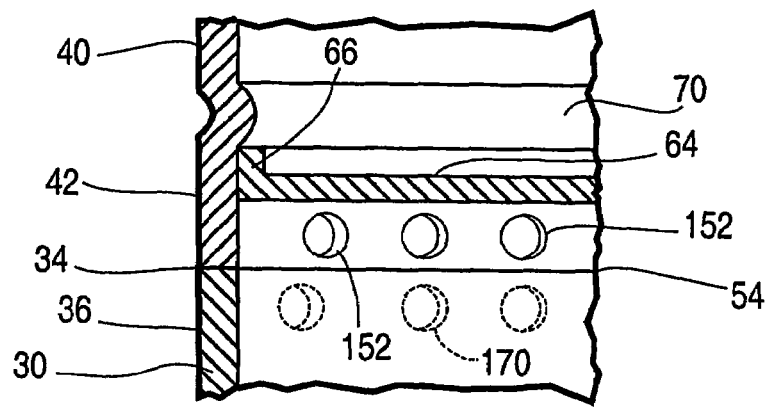
FIG. 7 is a cross-sectional detail similar to FIG. 3 but showing an alternate embodiment wherein outlet apertures are formed in a secondary inner shell.

In the alternative embodiment illustrated in FIG. 7, a plurality of outlet apertures 152 are formed about the circumference of the secondary inner shell 40 and are spaced a short distance from its first end 42. The illustrated apertures are circular but again other shapes are also possible such as square, rectangular and elliptical. The apertures 152 are preferably distributed evenly about the circumference of the secondary inner shell. There may or may not be outlet apertures 170 formed in the primary inner shell 30. Again, there is a butt or disconnected joint provided at 54.

Figure 8:
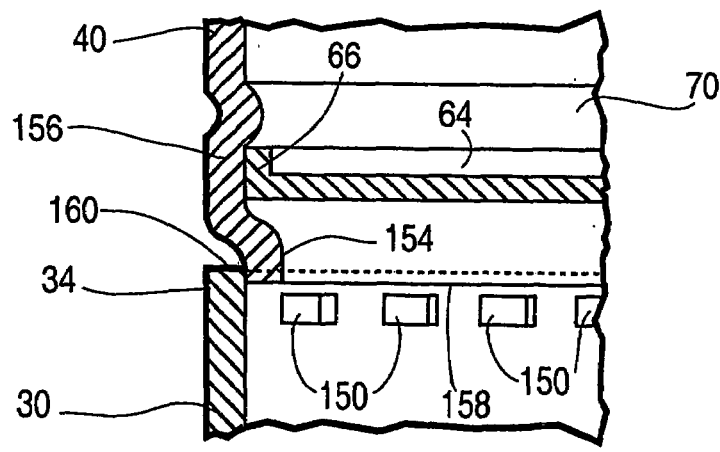
FIG. 8 is a cross-sectional detail similar to FIG. 3 but showing a further embodiment wherein outlet apertures are formed in the primary inner shell and the secondary inner shell is formed with a sleeve extension.
Figure 9:
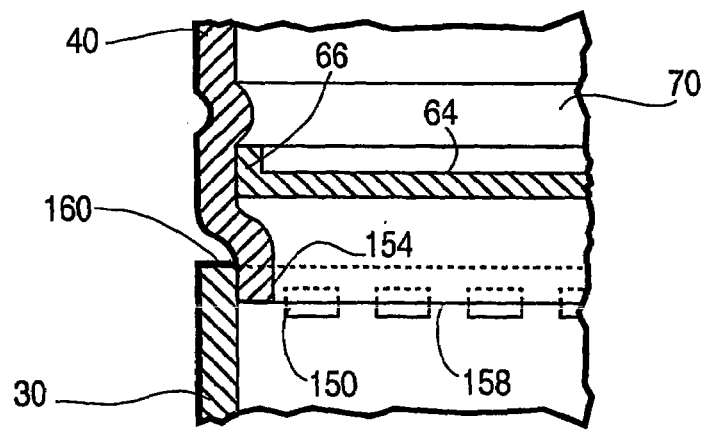
FIG. 9 is another cross-sectional detail of the embodiment of FIG. 8 but showing the two inner shells in a different or initial position.

Turning to the embodiment illustrated by FIGS. 8 and 9, this embodiment is similar to that illustrated in FIG. 6 in that the primary inner shell 30 is formed with a plurality of rectangular outlet apertures 150 located a short distance from the secondary end 34. However, in this embodiment, the upper or secondary inner shell 40 is formed with a short sleeve extension 154. This sleeve extension extends about the circumference of the inner shell 40 at the end adjacent to the secondary end 34 of the primary inner shell. The sleeve extension 154 is coaxial with a main peripheral side wall 156 of the inner shell 40. It will be understood that the peripheral side wall 156 has a first predetermined diameter while the sleeve extension 154 has a second predetermined diameter which is different from the first predetermined diameter and is in fact less than the first predetermined diameter in the embodiment illustrated in FIGS. 8 and 9. The sleeve extension 154 has a free end 158 located in the region of the outlet apertures 150. It will be understood that, as in the above described embodiments, the secondary shell member 40 is relatively movable during use of the fuel reformer between a first or initial position illustrated in FIG. 9 and a second position illustrated in FIG. 8. As shown in these figures, in the first position, the apertures 150 are partially blocked by the sleeve extension 154. However, as the fuel reformer heats up and the tube bundle expands, the inner shell 40 moves a short distance away from the primary inner shell 30 and thus, as shown in FIG. 8, the apertures 150 are at least substantially or entirely open for passage of the gaseous fluid out of the shell 30. In this embodiment, there is still a disconnected joint 160 but this joint is now formed between the secondary end 34 of the inner shell 30 and the adjacent end of the peripheral sidewall 156. In this embodiment, the external diameter of the sleeve extension 154 is only slightly smaller than the internal diameter of the inner shell 30.

Figure 10:
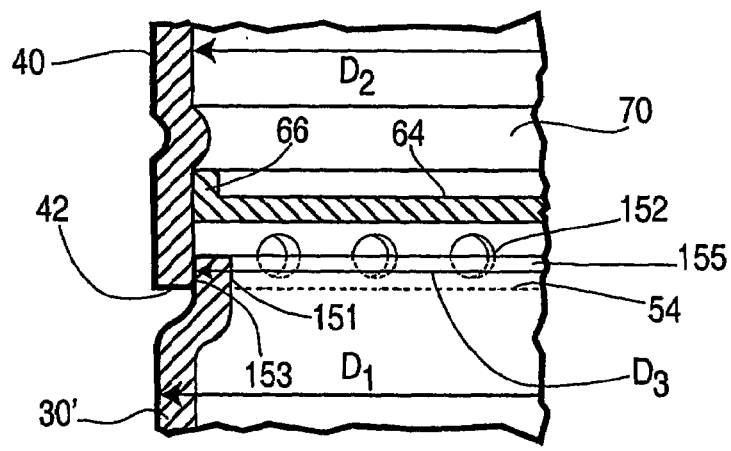
FIG. 10 is a further cross-sectional detail similar to FIG. 3 but showing another embodiment wherein outlet apertures are formed in the secondary inner shell and the primary inner shell is formed with a sleeve extension.

Turning to the variation shown in FIG. 10, this embodiment is similar to that shown in FIG. 7 in that the outlet apertures 152 are formed about the circumference of the secondary inner shell 40 and are spaced a short distance from its first end 42. The primary inner shell 30' is formed with a coaxial sleeve extension 151 connected to its sidewall at the shell's secondary end 34. It will be seen that the primary inner shell 30' has an external diameter $D_1$ while the secondary inner shell has an internal diameter $D_2$. The sleeve extension 151 has an external diameter $D_3$ as measured to exterior surface 153 which is different from the external diameter $D_1$ of primary inner shell 30' and different from the internal diameter $D_2$ of the secondary inner shell 40. In the preferred embodiment of FIG. 10, diameter $D_3$ is less than both diameters $D_1$ and $D_2$. The sleeve extension 151 has a free end 155 located in the region of the outlet apertures 152. As shown in FIG. 10, these apertures are partially blocked by the sleeve extension 151, but as the fuel reformer heats up, these apertures are less blocked or entirely open for passage of gaseous fluid.

It will be appreciated that variations of these alternative constructions are possible. For example, instead of the sleeve extension 154 of FIG. 9 or sleeve extension 151 of FIG. 10 being received inside the opposing inner shell, it is possible to construct the sleeve extension 151 or 154 to have an internal diameter larger than the external diameter of the opposing inner shell, so that the end of the opposing shell is received inside the sleeve extension 151 or 154. Alternatively, it is possible to provide apertures in both the sleeve extension and in the opposing inner shell. When the fuel reformer is cold, the apertures of the sleeve extension and the opposing inner shell would be only partially aligned, and as the fuel reformer warms up the apertures would be progressively brought into greater alignment with one another. Although alternative constructions are possible for the outlet apertures, generally these outlet apertures will be located or positioned adjacent to the butt or disconnected joint 54, 160.

Figure 11:
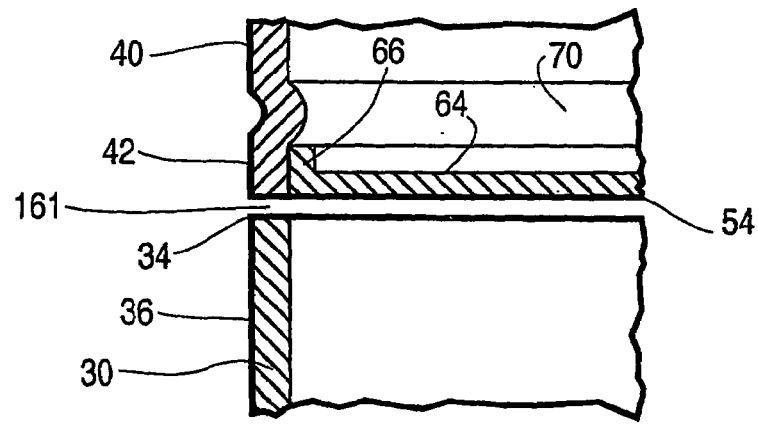
FIG. 11 is a further cross-sectional detail similar to FIG. 3 but showing another embodiment wherein a single, continuous outlet aperture is formed between the primary and secondary inner shells.

As shown in FIG. 11, it is also possible to construct the reformer such that a single, continuous aperture 161 exists between the primary and secondary inner shells. In such a construction, the tubes 50 are of sufficient length to create the aperture 161 between the primary and secondary inner shells, the gap 161 expanding in response to longitudinal expansion of the tubes 50.

Figure 14:
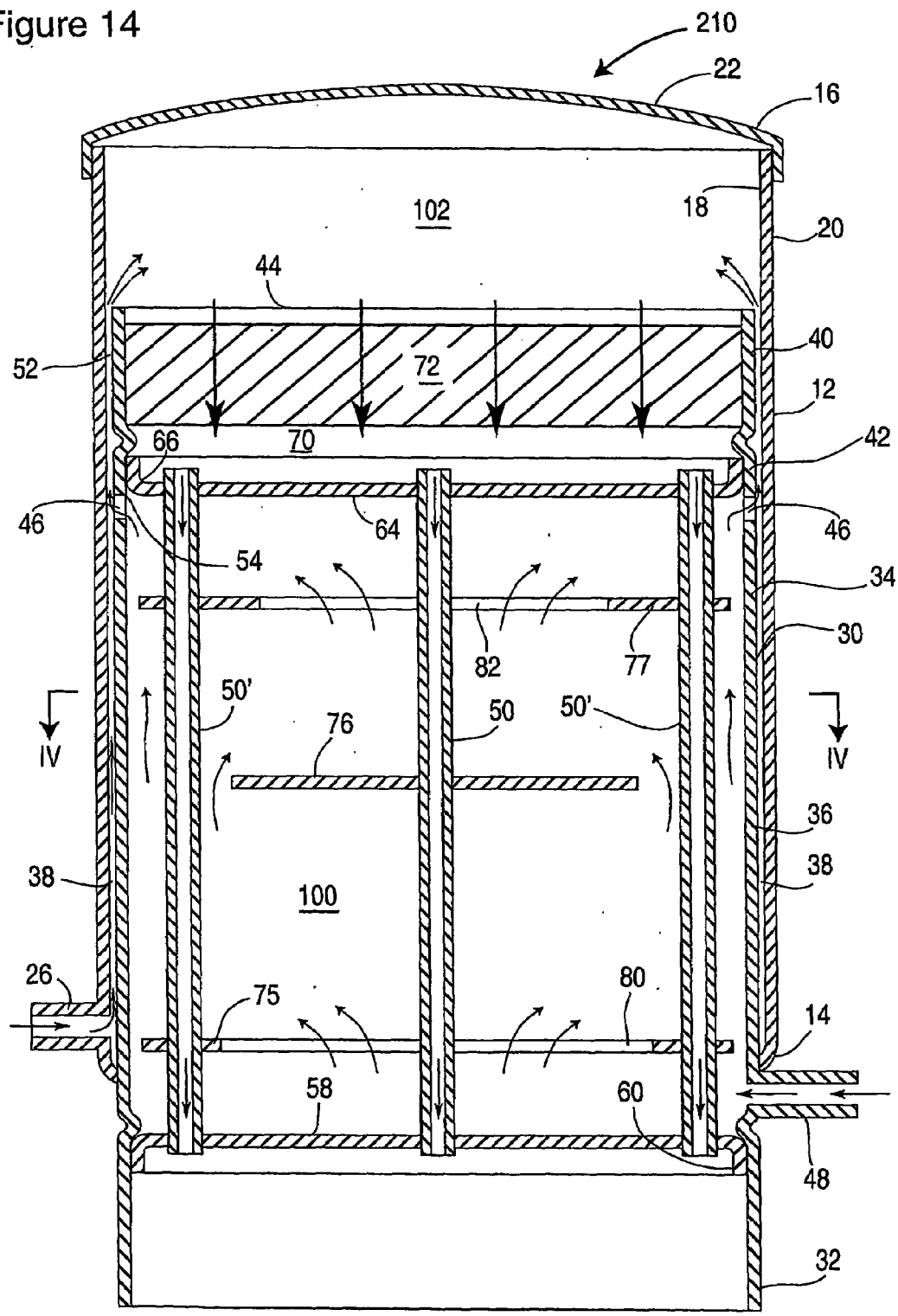
FIG. 14 is an axial cross-section of a further alternate embodiment of a fuel conversion reactor, comprising a fuel reformer wherein the second catalyst bed is eliminated.

It will be appreciated by those skilled in the art of fuel reforming that it is possible to construct a fuel reformer in accordance with this invention wherein one of the catalysts is omitted entirely and the reformer contains only the first catalyst 72 or the second catalyst 62. An example of such a fuel reformer 210 is illustrated in FIG. 14. Most of the components of fuel reformer 210 are identical to the components described above in connection with preferred fuel reformer 10, and are identified by identical reference numbers. Fuel reformer 210 differs from fuel reformer 10 in that the second catalyst 62 is omitted from fuel reformer 210. The preferred fuel reformer 210 may be utilized, for example, where it is desired to perform all the carbon monoxide cleanup reactions downstream of the reformer 210.

Although the preferred embodiment shown in FIG. 14 is suitable for use as a fuel reformer, it may instead be used as a catalytic burner to generate heat for use elsewhere in the fuel cell system, for example to heat steam for a fuel transformation reaction. The heat generated by the burner is preferably recovered downstream of the burner. In such an embodiment, the hydrogen-containing fuel may preferably be comprised partially or entirely of a fuel cell anode off-gas, which is reacted catalytically with an oxygen-containing gaseous fluid to generate hot combustion gases. Some of the heat contained in the combustion gases is transferred to the incoming fuel and gaseous fluid, and additional heat is preferably recovered by one or more heat exchangers which can either be discretely separate units or which can be integrated with the burner. As mentioned earlier, the other preferred fuel reformers described herein may also be similarly converted to catalytic burners.

As mentioned earlier, the preferred fuel reformers described herein can also be converted to non-catalytic burners by omitting both catalysts from the reformer structure. In a non-catalytic burner according to the invention, a hydrogen-containing fuel as in the catalytic burner described above is combusted with an oxygen-containing gaseous fluid in the upper chamber (for example chamber 102 of FIG. 1) of the burner. The hot combustion gases are then partially cooled by the incoming fuel and gaseous fluid as they pass through the tubes 50. The partially cooled combustion gases then exit the burner, where they are preferably further cooled by one or more additional heat exchangers which can either be discretely separate units or which can be integrated with the burner.

Figure 15:
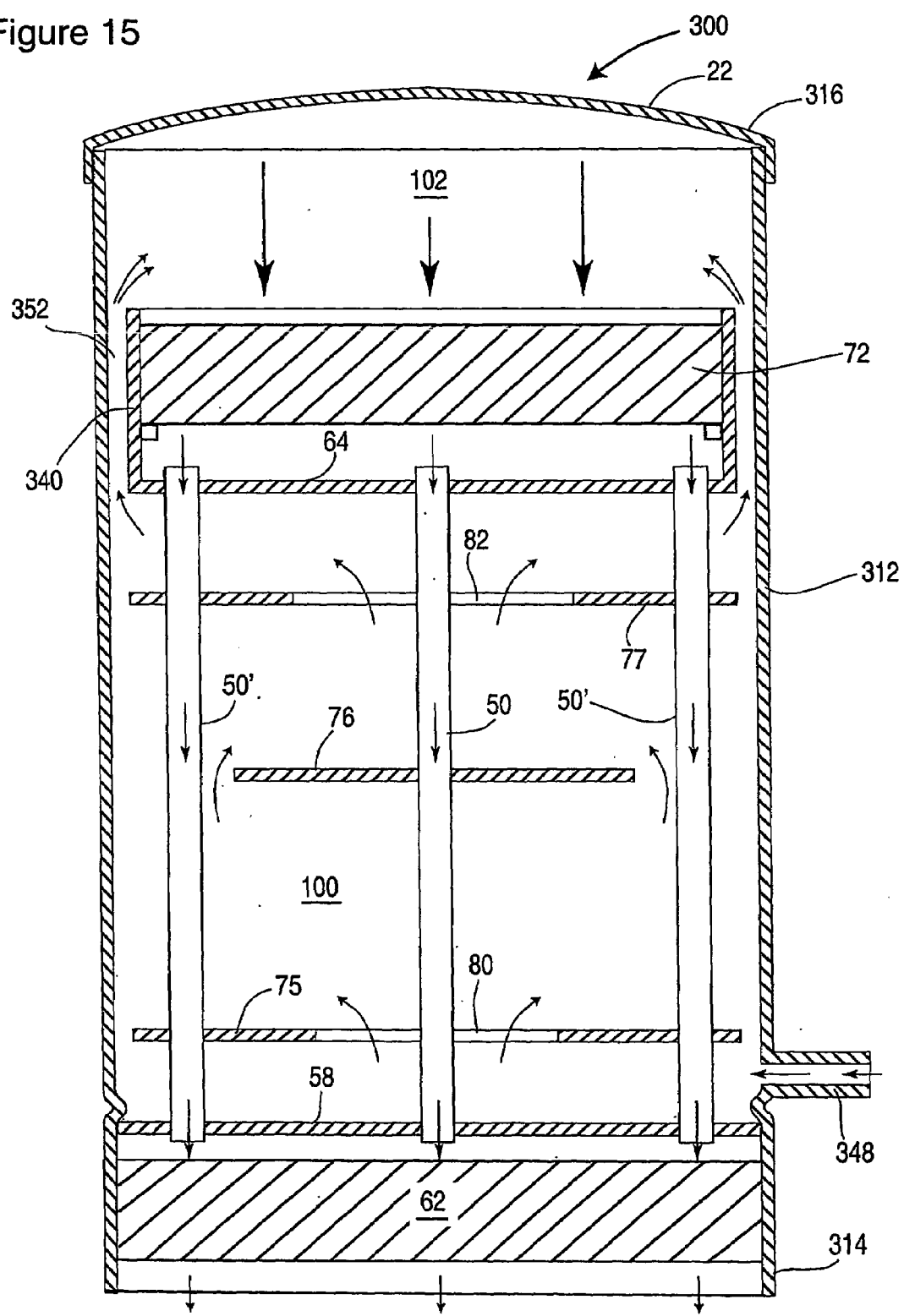
FIG. 15 is an axial cross-section of a single shell fuel conversion reactor according to a further alternate embodiment of the present invention.

FIG. 15 illustrates another preferred fuel reformer 300 according to the present invention which is also particularly useful as a catalytic or non-catalytic burner, as described above. Most of the components of fuel reformer 300 are identical to the components described above in connection with preferred fuel reformer 10, and are identified by identical reference numbers. Fuel reformer 300 differs primarily from that shown in FIG. 1 in that it is of a single shell design, having an outer shell 312 extending between a first end 314 and a second end 316 of the reformer 300. The reformer 300 has a single inlet through which both a hydrogen containing fuel and a gaseous fluid may be introduced into the heat exchanging chamber 100. Alternatively, the hydrogen-containing fuel and the gaseous fluid may be introduced through separate inlets (not shown), including a configuration as in FIG. 5 where the fuel is introduced through the top cap member 22.

In reformer 300, the hydrogen-containing fuel and the gaseous fluid are mixed inside the heat exchanging chamber 100, flowing around and through baffle plates 75, 76 and 77 and into annular passage 352 which connects the heat exchange chamber 100 to the upper chamber 102. The mixed fuel and gaseous fluid are reacted as they flow through catalyst 72 to produce hydrogen and carbon monoxide, preferably by an autothermal reformation. The hot reformate flows through tubes 50 and transfers some of its heat to the fuel and gaseous fluid flowing through the heat exchange chamber 100.

The annular passage 352 is formed between outer shell 312 and inner shell 340 which is secured to second tube sheet 64. Thermal stresses are prevented by the lack of a secured connection between the inner shell 340 and outer shell 312, thereby forming a disconnected joint whereby axial expansion of the tubes results in relative axial movement of the inner shell 340 relative to the outer shell 312.

Although reformer 300 is shown as comprising a reformer having two catalysts 72 and 62, it will be appreciated that reformer 300 may also be used as a fuel reformer having a single catalyst, or may be used as a catalytic or non-catalytic burner, as described above. It will also be appreciated that reformer 300 may be provided with ribs 24, dimples 25 or the like to centre the inner shell 340 within the outer shell 312, in the manner described above with reference to the other preferred embodiments.

Figure 16:
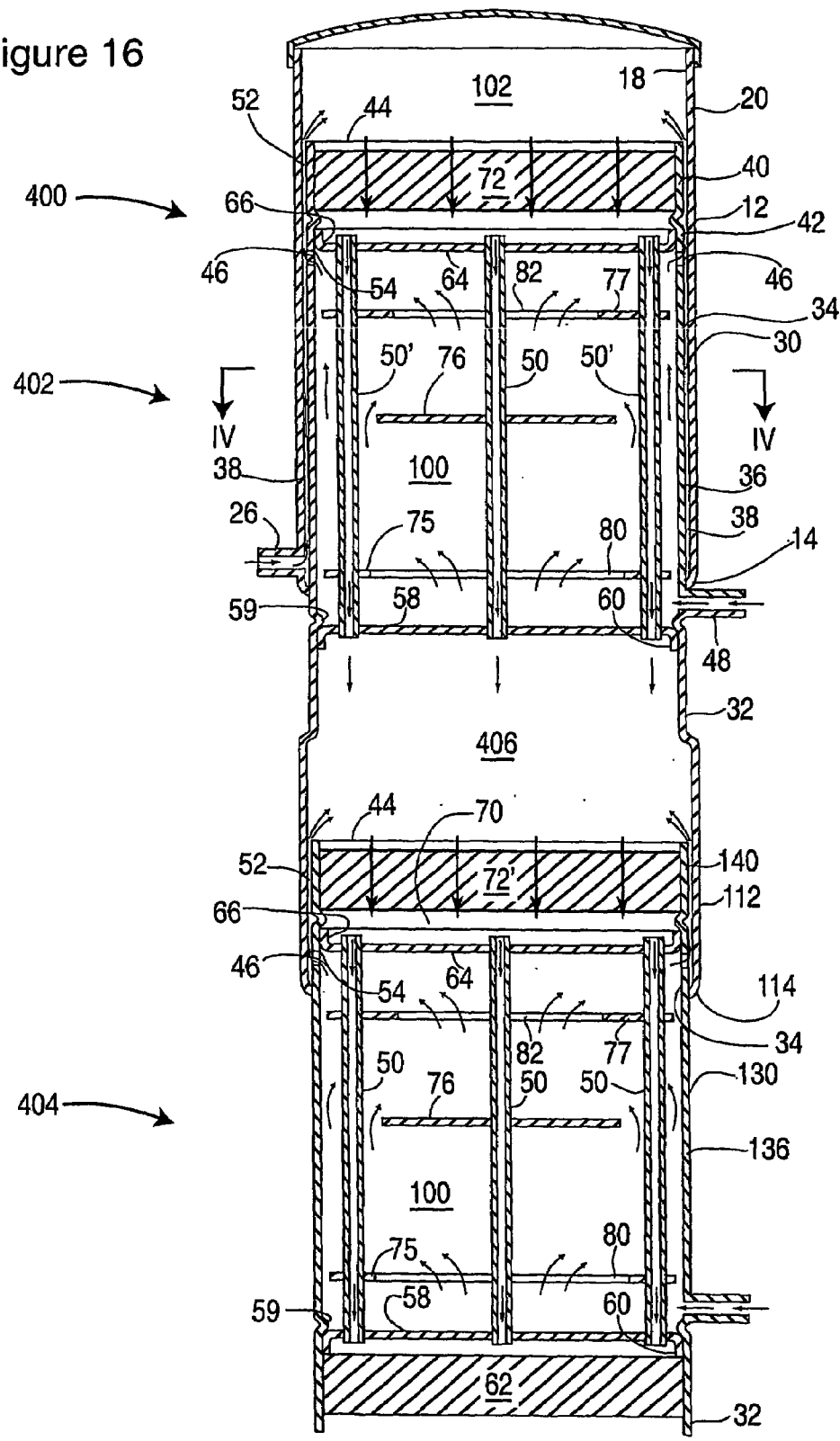
FIG. 16 is an axial cross-section of an integrated fuel conversion reactor according to the present invention.

Also included within the scope of the present invention are integrated fuel conversion reactors in which two or more individual reactors according to the invention are joined end-to-end to form integrated structures. The integrated structures may preferably be formed by welding or brazing the outer shells of the individual reactors. FIG. 16 illustrates one preferred form of integrated reactor, comprising a fuel reformer 400 in which a reactor 402 similar to that shown in FIG. 1 and having a single catalyst 72 is coupled end-to-end with a reactor similar to that shown in FIG. 5 and having a pair of catalysts 72' and 62. In a particularly preferred embodiment, the catalyst 72 of reactor 402 comprises a fuel transformation catalyst for converting a hydrogen-containing fuel to hydrogen, preferably an autothermal reformation catalyst. The catalysts 72' and 62 of reactor 404 may preferably comprise high and low temperature shift reaction catalysts, respectively. In this reactor 400, the hot reformate produced in catalyst 72 flows through tubes 50 of reactor 402 and into a mixing chamber 406 where it is combined with steam preheated in heat exchange chamber 100 of reactor 404. The carbon-monoxide depleted reformate flows from catalyst 72' through tubes 50 of reactor 404 where it is cooled by heat exchange with the steam in chamber 100, before entering catalyst 62 for the low temperature shift reaction. Similarly, it is possible to provide an integrated system which includes a preferential oxidation catalyst.

Figure 17:
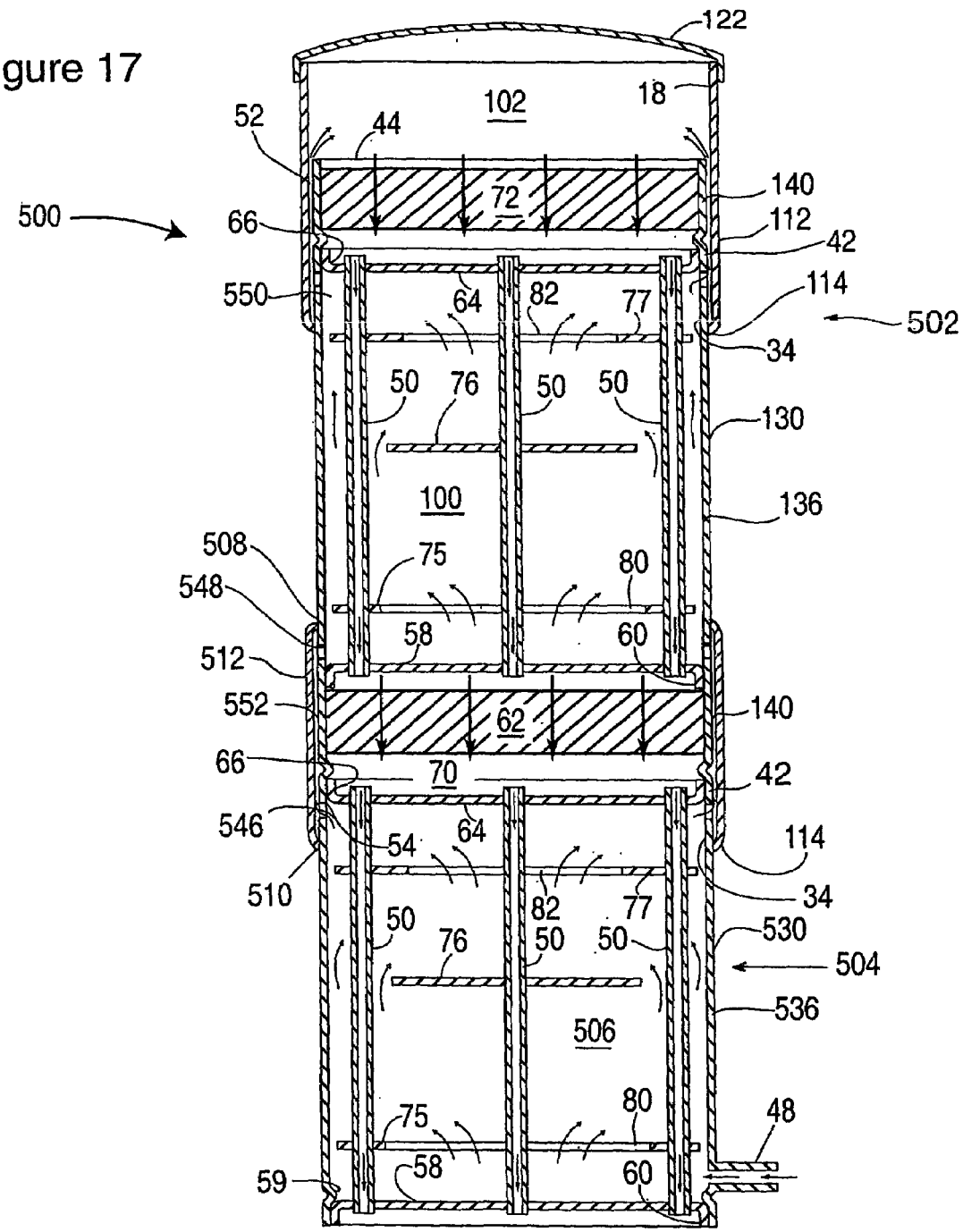
FIG. 17 is an axial cross-section of an integrated fuel conversion reactor according to another embodiment of the present invention.

Another form of integrated fuel conversion reactor 500 is illustrated in FIG. 17. As discussed in detail below, reactor 500 is designed to avoid super-cooling of reformate between the first catalyst 72 and the second catalyst 62 as may occur in heat exchangers 10 and 110 of FIGS. 1 and 5, under certain conditions. The temperature of the gaseous mixture entering inlet 48 is a function of upstream system design and operating conditions. As such, the temperature of the gaseous mixture may vary somewhat depending on the operating conditions. For example, in a specific autothermal reformation system the temperature of the gaseous mixture entering inlet 48 may be about 180° C. under full load conditions but may drop to about 160° C. under part load conditions. The operating temperature of the second catalyst 62, on the other hand, may need to be about 230° C. Thus, particularly under part load conditions, there is a possibility that the reformate passing between catalysts 72 and 62 could be super-cooled by the gaseous mixture passing through heat exchanging chamber 100. This problem may be compounded if water is added through tube 190 as in FIG. 1 due to the cooling effect of water. Super-cooling of reformate in prior art reactors has been avoided by provision of a by-pass line and valve by which a portion of the gaseous mixture by-passes chamber 100 under part load conditions. However, the valve and lines add complexity to the fuel reformer and exposure of the valve to high temperatures can introduce valve durability or reliability limitations.

The reactor 500 avoids super-cooling by providing an integrated structure comprising a first heat exchanger section 502 having first and second catalysts 72 and 62 and a second heat exchanger section 504 into which the gaseous mixture is introduced and heated by the reformate flowing from the second catalyst 62. The structure and operation of reactor 500 are now discussed in detail below.

The first heat exchanger section 502 of reactor 500 is similar in structure to the fuel conversion reactor 110 shown in FIG. 5, and like components thereof are identified by like reference numbers. The first heat exchanger section 502 includes a first catalyst 72 which may preferably be an autothermal reformation catalyst and a second catalyst 62 which may preferably comprise a carbon monoxide cleanup catalyst, for example a shift reaction catalyst.

The second heat exchanger section 504 also has some similarity in structure to the fuel conversion reactor 110 shown in FIG. 5, having tubes 50 extending between tube sheets 58 and 64 and with baffle plates 75, 76 and 77 being provided on the tubes 50. The second heat exchanger section 504 has a primary shell 530 with an outer surface 536 and is provided with an inlet 48 located proximate tube sheet 58 through which a gaseous mixture enters heat exchanging chamber 506 to be heated by reformate leaving second catalyst 62 through tubes 50. Subject to the discussion below, the primary shell 530 of second heat exchanger section may comprise an extension of the primary shell 130 of the first heat exchanger section 502.

In the heat exchanger 500 shown in FIG. 17, the gaseous mixture entering the second heat exchanger section 504 through inlet 48 comprises fuel, air and steam. Accordingly, heat exchanger 500 is further distinguished from heat exchangers 10 and 110 in that it does not include a separate inlet for fuel. It will however be appreciated that the heat exchanger 500 could instead be provided with a separate fuel inlet analogous to inlet 26 in the outer shell 12 of heat exchanger 10 or inlet 126 in the top cap member 122 of heat exchanger 110. Where heat exchanger 500 is provided with a fuel inlet analogous to fuel inlet 26, it will be appreciated that the outer shell 112 would be extended downwardly as in FIG. 1.

An outer shell section 512 surrounds the lower portion of the first heat exchanger section 502 and the upper portion of the second heat exchanger section 504. The outer shell section 512 is rigidly attached at its upper end 508 to the primary shell 130 of first heat exchanger section 502 and is rigidly attached at its lower end 510 to the primary shell 530 of the second heat exchanger section 504. Between its upper and lower ends 508, 510 the outer shell section 512 is spaced from the outer surfaces 136, 536 of the primary shells 130, 530 so as to form an annular passageway 552 for passage of the gaseous mixture of fuel, steam and air from the heat exchanging chamber 506 of the second heat exchanger section 504 to the heat exchanging chamber 100 of the first heat exchanger section 502. The gaseous mixture enters the annular passageway 552 through one or more openings 546 provided in the outer shell 530 (or between shells 530 and 130) proximate tube sheet 64 of second heat exchanger section 504 and leaves the annular passageway 552 through one or more openings 548 provided in the outer shell 130 of the first heat exchanger section 502.

The structure of openings 546 and 548, as well as openings 550 proximate tube sheet 64 of first heat exchanger section 502, will now be discussed in detail. The openings 546, 548 and 550 can be in the form of discrete apertures formed in-shells 130 and 530 or can be in the form of disconnected joints similar in structure to disconnected joint 54. Where a disconnected joint is provided, it will be appreciated that the joint could have a structure as shown in any of FIGS. 1 and 5 to 10, including the apertures shown therein.

Figure 18:
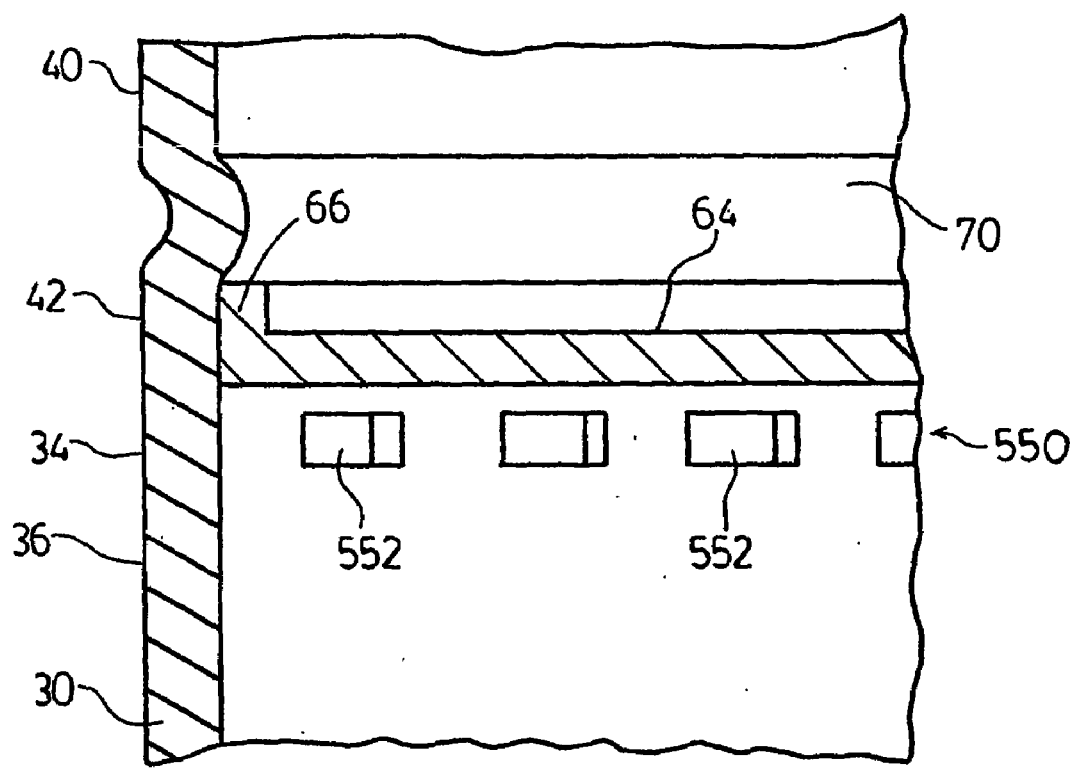
FIG. 18 is a cross-sectional detail similar to FIG. 6 showing discrete outlet apertures formed in the primary inner shell of the first heat exchanger section of the fuel conversion reactor shown in FIG. 17.

For example, FIG. 18 illustrates an embodiment in which openings 550 comprise a plurality of discrete apertures 552 and no disconnected joint is provided. It is however preferred to provide a disconnected joint 54 as illustrated in FIGS. 1 and 5 to 10 to accommodate longitudinal thermal expansion of the tubes 50 of the first heat exchanger section 502.

The at least one opening 548 can also be in the form of discrete apertures formed in shell 130 as shown in FIG. 18 or a single, continuous opening 548 could be provided in the form of a disconnected joint whereby the portion of shell 130 located above opening 548 is disconnected from the portion of shell below opening 548. Such a disconnected joint formed by opening 548 could have a structure as shown in any of FIGS. 1 and 5 to 10.

The at least one opening 546 is formed between the shell 130 of the first heat exchange section 502 and the shell 530 of the second heat exchange section 504. Opening 546 can be in the form of a plurality of discrete apertures as shown in FIG. 18 such that the shell 530 forms an integral extension of shell 130 and no disconnected joint is formed. Alternatively, a single continuous opening 546 could be provided such that shells 130 and 530 are separate from one another and a disconnected joint is provided. The disconnected joint formed by opening 546 could have a structure as shown in any one of FIGS. 1 and 5 to 10.

It is preferred that a disconnected joint be provided at one or more of openings 546, 548 and 550 so as to accommodate thermal expansion of the heat exchanger 500. More preferably, a disconnected joint is provided at least at opening 550 so as to accommodate thermal expansion of the tubes 50 of first heat exchanger section 502 caused by the relatively high temperature reformate produced by first catalyst 72. Where a disconnected joint is provided at opening 550, the openings 546 and 548 may preferably each comprise a plurality of spaced apertures. The provision of an additional disconnected joint at opening 546 or 548 is relatively unimportant in this case since there is usually a relatively small temperature difference across, the second catalyst 62. It may also be preferred to provide disconnected joints at both of openings 546 and 548, and eliminate the disconnected joint at opening 550. Where disconnected joints are provided at openings 546 or 548 they are preferably "pre-spaced" as shown in FIG. 11 since the open area of the joint will decrease due to thermal expansion of the tubes 50 in the first heat exchanger section 502. In this case it may be necessary to provide slotted holes to avoid restriction of gas flow or a predetermination of an acceptable minimum gap.

Figure 19:
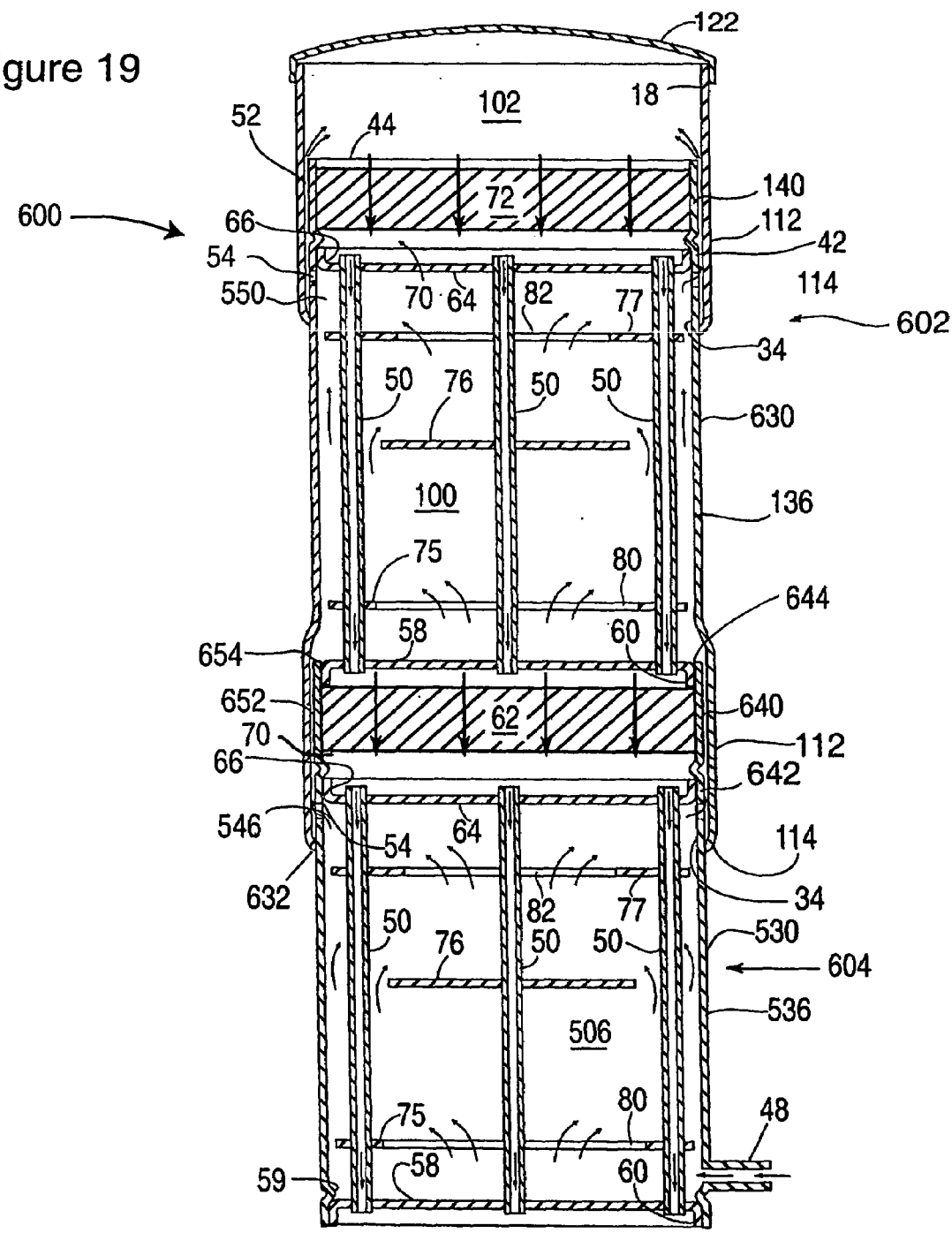
FIG. 19 is an axial cross-section of an integrated fuel conversion reactor according to yet another embodiment of the present invention.

FIG. 19 illustrates another example of an integrated fuel conversion reactor 600 which is similar in structure and operation to the reactor 500 shown in FIG. 17, and like components are identified by like reference numbers. Fuel conversion-reactor 600 includes a first heat exchanger section 602 having first and second catalysts 72, 62 and is preferably identical to the first heat exchanger section 502 of reactor 500 except for the differences noted below. The reactor 600 also includes a second heat exchanger section 604 which is preferably identical to section 504 of reactor 500 except where noted below.

In reactor 600 the outer shell section 512 is eliminated and at least the first heat exchanger section 502 is provided with a primary shell 630 which is of enlarged diameter at least proximate to its primary end 632. The primary shell 630 fits over a secondary inner shell 640 having a first end 642 proximate the at least one opening 546 of the primary shell 530 of the second heat exchanger section 604 and a second end 644 which is rigidly secured to the flange 60 of tube sheet 58 of the first heat exchanger section 602. The primary end 632 of the shell 630 is rigidly secured to the primary shell 530 of second section 604 below the openings 546 so as to form a passageway 652 for flow of gas between the chambers 506 and 100 of the first and second heat exchanger sections 602 and 604. It will be seen that an annular aperture 654 is formed between the primary shell 630 and the second end 644 of the primary shell 530. Preferably, one or both of the openings 546 and 550 of heat exchanger 600 are in the form of disconnected joints as described above with reference to FIG. 17. More preferably, at least opening 550 is in the form of a disconnected joint.

It will be appreciated by those skilled in the art of fuel reformers that various modifications and changes can be made to the illustrated and described fuel reformer without departing from the spirit and scope of this invention. Accordingly, all such modifications and changes as fall within the scope of the appended claims are intended to be included within the scope of this invention.

What is claimed is:

1. In a fuel conversion reactor, a shell-and-tube heat exchanger for heating a gaseous fluid prior to reaction with a fuel and for cooling a gaseous mixture produced by the reaction, said heat exchanger comprising:
   (a) a first heat exchanger section comprising:
      (i) a first primary shell member having primary and secondary ends and a sidewall extending between said ends and defining a first heat exchanging chamber located within the first primary shell member;
      (ii) a first tube sheet fixedly mounted on said first primary shell member in the vicinity of said primary end and sealingly closing said first heat exchanging chamber at one end of the first chamber;
      (iii) a first tube sheet device which is separate from said first primary shell member and is located in the vicinity of said secondary end, said first tube sheet device forming another end of said first chamber that is opposite said one end of the first chamber; and
      (iv) a first plurality of heat exchange tubes extending from said first tube sheet to said first tube sheet device and rigidly connected to both the first tube sheet and the first tube sheet device, said heat exchange tubes providing passageways for said gaseous mixture to flow inside the tubes through said first heat exchanging chamber; and
      (v) one or more outlet apertures formed in the region of said secondary end of said first primary shell member in order to provide at least one outlet for said gaseous fluid which flows through said first heat exchanging chamber on a shell-side thereof during operation of said fuel conversion reactor; and
   (b) a second heat exchanger section comprising:
      (i) a second primary shell member having primary and secondary ends and a sidewall extending between said ends and defining a second heat exchanging chamber in flow communication with the first heat exchanging chamber, the second primary shell member being concentric with the first primary shell member with the primary end of the first primary shell member being located proximate the secondary end of the second primary shell member;
      (ii) a second plurality of heat exchange tubes mounted in the second primary shell member and communicating with the heat exchange tubes of the first heat exchanger section;
      (iii) an inlet in the sidewall of the second primary shell member for introducing the gaseous fluid into the second heat exchanging chamber;
      (iv) one or more outlet apertures formed in the region of the secondary end of the second primary shell member to provide at least one outlet for the gaseous fluid to flow from the second heat exchanging chamber to the first heat exchanging chamber;
   wherein the first heat exchanger section further comprises one or more inlet apertures formed in the region of the primary end of the first primary shell member to provide at least one inlet for the gaseous fluid to flow into the first heat exchanging chamber from the second heat exchanging chamber.

2. A fuel conversion reactor according to claim 1, further comprising an outer shell section having first and second ends surrounding the secondary end of the second primary shell member and the primary end of the first primary shell member and forming a passageway for flow of the gaseous fluid from the second heat exchanging chamber to the first heat exchanging chamber, the first and second ends of the outer shell section being rigidly attached to the respective sidewalls of the first and second primary shell members, said passageway being formed between the outer shell section and the shell members.

3. A fuel conversion reactor according to claim 2, wherein the one or more outlet apertures formed in the region of the secondary end of the second primary shell member are formed between the first and second primary shell members.

4. A fuel conversion reactor according to claim 3, wherein the one or more outlet apertures formed in the region of the secondary end of the second primary shell member comprises a disconnected joint between the first and second primary shell members.

5. A fuel conversion reactor according to claim 1, wherein the primary end of the first primary shell member is of a greater diameter than the secondary end of the second primary shell member and wherein the secondary end of the second primary shell member is received inside the primary end of the first primary shell member, and wherein the primary end of the first primary shell member is rigidly attached to the sidewall of the second primary shell member such that a passageway for flow of the gaseous fluid from the second to the first heat exchanging chamber is formed between the first and second primary shell members.

6. A fuel conversion reactor according to claim 5, wherein the one or more inlet apertures comprise a continuous annular gap between the first and second primary shell members.

7. A fuel conversion reactor according to claim 1, wherein the one or more inlet apertures comprises a disconnected joint formed in the sidewall of the first primary shell member proximate its primary end.

8. A fuel conversion reactor according to claim 1, wherein the second heat exchanger section further comprises:
 a second tube sheet fixedly mounted on said secondary shell member in the vicinity of said secondary end thereof and sealingly closing said second heat exchanging chamber at one end of the second chamber; and
 a second tube sheet device which is separate from said second primary shell member and is located in the vicinity of said secondary end thereof, said second tube sheet device forming another end of said second heat exchanging chamber that is opposite said one end of the second chamber;
 wherein said second plurality of heat exchange tubes extend from said second tube sheet to said second tube sheet device and are rigidly connected to both the second tube sheet and the second tube sheet device, and wherein said second plurality of heat exchange tubes provide passageways for said gaseous mixture to flow inside the tubes through said second heat exchanging chamber.

9. A fuel conversion reactor according to claim 1, wherein the inlet for introducing the gaseous fluid is provided in the primary end of the second primary shell member.

10. A fuel conversion reactor according to claim 1, further comprising an outer shell having first and second ends and an outer shell wall extending between said first and second ends, said outer shell being closed at said second end;
 wherein said outer shell wall extends around said first primary shell member and said first tube sheet device, and said outer shell wall is provided with an inlet for said fuel; and
 wherein a fuel passageway is formed between said outer shell wall and said sidewall of the first primary shell member and extends from said inlet for the fuel to said one or more outlet apertures formed in the region of said secondary end of said first primary shell member.

11. A fuel conversion reactor according to claim 1, wherein said first tube sheet device includes a first secondary shell member having a peripheral sidewall with one end of the first secondary shell member being located adjacent to said secondary end of the first primary shell member; and
 wherein said fuel conversion reactor further comprises a first catalyst to catalyze the reaction of the fuel and the gaseous fluid, said first catalyst being mounted in said first secondary shell member.

12. A fuel conversion reactor according to claim 11, wherein the first catalyst is a fuel transformation catalyst for converting a hydrogen-containing fuel to hydrogen.

13. A fuel conversion reactor according to claim 12, wherein the first catalyst is an autothermal reformation catalyst.

14. A fuel conversion reactor according to claim 11, further comprising a second catalyst located between the first tube sheet and the second tube sheet device into which said gaseous mixture flows from the first plurality of heat exchange tubes and from which said gaseous mixture flows to said second plurality of heat exchange tubes.

15. A fuel conversion reactor according to claim 14, wherein said second tube sheet device includes a second secondary shell member having a peripheral sidewall with one end of the second secondary shell member being located adjacent to said secondary end of the second primary shell member; and wherein said second catalyst is mounted in said second secondary shell member.

16. A fuel conversion reactor according to claim 14, wherein the second catalyst comprises a carbon monoxide cleanup catalyst.

17. A fuel conversion reactor according to claim 16, wherein the second catalyst comprises a shift reaction catalyst.

18. A fuel conversion reactor according to claim 1, further comprising an outlet for said gaseous mixture exiting said second plurality of heat exchange tubes, wherein the outlet for said gaseous mixture is provided at the primary end of the first primary shell member.

19. A fuel conversion reactor according to claim 2, wherein said one or more outlet apertures formed in the region of the secondary end of the second primary shell member are in flow communication with said passageway for flow of the gaseous fluid formed by the outer shell section, such that the gaseous fluid enters said passageway through said one or more outlet apertures; and
 wherein said one or more inlet apertures of the first heat exchanger section are in flow communication with said passageway, such that the gaseous fluid exits said passageway through said one or more inlet apertures.

20. A fuel conversion reactor according to claim 19, wherein said one or more outlet apertures of the second primary shell member are in the form of a plurality of discrete apertures arranged in spaced relation to one another in said second primary shell member, and wherein said one or more inlet apertures of the first primary shell member are in the form of a plurality of discrete apertures arranged in spaced relation to one another in said first primary shell member.

21. A fuel conversion reactor according to claim 1, wherein said one or more outlet apertures formed in the region of the secondary end of the first primary shell member comprises a disconnected joint between the sidewall of the first primary shell member and the first tube sheet device.

22. A fuel conversion reactor according to claim 6, wherein said one or more outlet apertures formed in the region of the secondary end of the second primary shell member are in flow communication with said passageway for flow of the gaseous fluid formed between the first and second primary shell members, such that the gaseous fluid enters said passageway through said one or more outlet apertures; and wherein said gaseous fluid exits said passageway through said continuous annular gap between the first and second shell members.

23. In a fuel conversion reactor, a shell-and-tube heat exchanger for heating a gaseous fluid prior to reaction with a fuel and for cooling a gaseous mixture produced by the reaction, said heat exchanger comprising:
(a) a first heat exchanger section comprising:
  (i) a first primary shell member having primary and secondary ends and a sidewall extending between said ends and defining a first heat exchanging chamber located within the first primary shell member;
  (ii) a first tube sheet fixedly mounted on said first primary shell member in the vicinity of said primary end and sealingly closing said first heat exchanging chamber at one end of the first chamber;
  (iii) a first tube sheet device which is separate from said first primary shell member and is located in the vicinity of said secondary end, said first tube sheet device forming another end of said first chamber that is opposite said one end of the first chamber;
  (iv) a first plurality of heat exchange tubes extending from said first tube sheet to said first tube sheet device and rigidly connected to both the first tube sheet and the first tube sheet device, said heat exchange tubes providing passageways for said gaseous mixture to flow inside the tubes through said first heat exchanging chamber;
  (v) one or more outlet apertures formed in the region of said secondary end of said first primary shell member in order to provide at least one outlet for said gaseous fluid which flows through said first heat exchanging chamber on a shell-side thereof during operation of said fuel conversion reactor;
  (vi) an outer shell having first and second ends and an outer shell wall extending between said first and second ends, said outer shell being closed at said second end, extending around said primary shell member and said first tube sheet device, and having an inlet for said fuel, wherein a fuel passageway is formed between said outer shell wall and said sidewall of the primary shell member and extends from said inlet for the fuel to said one or more outlet apertures; and
  (vii) a first inlet in the sidewall of the first primary shell member for introducing a first said gaseous fluid into the first heat exchanging chamber;
(b) a second heat exchanger section comprising:
  (i) a second primary shell member having primary and secondary ends and a sidewall extending between said ends and defining a second heat exchanging chamber, the second primary shell member being concentric with the first primary shell member with the primary end of the first primary shell member being located proximate the secondary end of the second primary shell member with a mixing chamber defined therebetween;
  (ii) a second plurality of heat exchange tubes mounted in the second primary shell member in flow communication with the heat exchange tubes of the first heat exchanger section through said mixing chamber;
  (iii) a second inlet in the sidewall of the second primary shell member for introducing a second said gaseous fluid into the second heat exchanging chamber;
  (iv) one or more outlet apertures formed in the region of the secondary end of the second primary shell member to provide at least one outlet for the gaseous fluid to flow from the second heat exchanging chamber to the mixing chamber;
wherein the first tube sheet seals the first heat exchanging chamber against flow communication with the mixing chamber and the second heat exchanging chamber.

24. A fuel conversion reactor according to claim 23, wherein the primary end of the first primary shell member is of a greater diameter than the secondary end of the second primary shell member and wherein the secondary end of the second primary shell member is received inside the primary end of the first primary shell member, and wherein the primary end of the first primary shell member is rigidly attached to the sidewall of the second primary shell member such that a passageway for flow of the gaseous fluid from the second heat exchanging chamber to the mixing chamber is formed between the first and second primary shell members.

25. A fuel conversion reactor according to claim 23, wherein the second heat exchanger section further comprises:
a second tube sheet fixedly mounted on said secondary shell member in the vicinity of said secondary end thereof and sealingly closing said second heat exchanging chamber at one end of the second chamber; and
a second tube sheet device which is separate from said second primary shell member and is located in the vicinity of said secondary end thereof, said second tube sheet device forming another end of said second heat exchanging chamber that is opposite said one end of the second chamber;
wherein said second plurality of heat exchange tubes extend from said second tube sheet to said second tube sheet device and are rigidly connected to both the second tube sheet and the second tube sheet device, and wherein said second plurality of heat exchange tubes provide passageways for said gaseous mixture to flow inside the tubes through said second heat exchanging chamber.

26. A fuel conversion reactor according to claim 23, wherein the first inlet for introducing the first gaseous fluid is provided in the primary end of the first primary shell member and the second inlet for introducing the second gaseous fluid is provided in the primary end of the second primary shell member.

27. A fuel conversion reactor according to claim 23, wherein said first tube sheet device includes a first secondary shell member having a peripheral sidewall with one end of the first secondary shell member being located adjacent to said secondary end of the first primary shell member; and wherein said fuel conversion reactor further comprises a first catalyst to catalyze the reaction of the fuel and the first gaseous fluid to produce a first said gaseous mixture, said first catalyst being mounted in said first secondary shell member.

28. A fuel conversion reactor according to claim 27, wherein the first catalyst is a fuel transformation catalyst for converting a hydrogen-containing fuel to hydrogen.

29. A fuel conversion reactor according to claim 28, wherein the first catalyst is an autothermal reformation catalyst.

30. A fuel conversion reactor according to claim 27, wherein said mixing chamber receives said first said gaseous mixture from said first plurality of heat exchange tubes and said second gaseous fluid from said second heat exchanging chamber, and wherein said fuel conversion reactor further comprises a second catalyst in which said first gaseous mixture and the second gaseous fluid are reacted to produce a second said gaseous mixture, and from which said second gaseous mixture flows to said second plurality of heat exchange tubes.

31. A fuel conversion reactor according to claim 30, wherein said second tube sheet device includes a second secondary shell member having a peripheral sidewall with one end of the second secondary shell member being located adjacent to said secondary end of the second primary shell member; and wherein said second catalyst is mounted in said second secondary shell member.

32. A fuel conversion reactor according to claim 30, wherein the second catalyst comprises a high temperature gas shift catalyst.

33. A fuel conversion reactor according to claim 30, further comprising a third catalyst in which said second gaseous mixture received from said second plurality of heat exchange tubes is further reacted to produce a third said gaseous mixture.

34. A fuel conversion reactor according to claim 33, wherein said third catalyst comprises a low temperature gas shift catalyst.

* * * * *